(12) United States Patent
Homma

(10) Patent No.: US 9,635,207 B2
(45) Date of Patent: Apr. 25, 2017

(54) MANAGEMENT SYSTEM AND INFORMATION PROCESSING APPARATUS MANAGING INSTALLATION AND SETTINGS OF AN APPLICATION

(71) Applicant: CANON KABUSHIKI KAISHA, Tokyo (JP)

(72) Inventor: Takayuki Homma, Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/161,799

(22) Filed: May 23, 2016

(65) Prior Publication Data
US 2016/0360059 A1    Dec. 8, 2016

(30) Foreign Application Priority Data
Jun. 8, 2015    (JP) .................... 2015-116028

(51) Int. Cl.
*H04N 1/00*    (2006.01)
(52) U.S. Cl.
CPC ..... *H04N 1/00962* (2013.01); *H04N 1/00244* (2013.01); *H04N 1/00411* (2013.01); *H04N 2201/0094* (2013.01)
(58) Field of Classification Search
None
See application file for complete search history.

(56) References Cited

U.S. PATENT DOCUMENTS

| 2002/0061204 | A1* | 5/2002 | Tamai | H04N 1/00204 399/82 |
| 2004/0255263 | A1* | 12/2004 | Ando | G06F 8/60 717/100 |
| 2005/0227154 | A1* | 10/2005 | Motoki | G03B 42/02 430/22 |
| 2006/0262334 | A1* | 11/2006 | Kaneshiro | G06F 3/1206 358/1.13 |
| 2007/0006324 | A1* | 1/2007 | Osada | G06F 21/608 726/27 |

(Continued)

OTHER PUBLICATIONS

OSGi Service Platform Core Specification, Release 4 (2005), retrieved on May 23, 2016, from http://www.osgi.org/Download/Release4V40 (276 pages).

*Primary Examiner* — Ming Hon
(74) *Attorney, Agent, or Firm* — Fitzpatrick, Cella, Harper & Scinto

(57) ABSTRACT

An information processing apparatus comprises: an obtainment unit that obtains an application-related job from a management apparatus; a control unit that controls an application for the information processing apparatus in accordance with the obtained job; and a setting unit that changes, along with the control by the control unit, at least one of settings of the information processing apparatus and settings of the application in accordance with setting information included in the obtained job, wherein in a case where the obtained job represents an instruction to install the application, the control unit obtains, from the distribution apparatus, an application file and a license file that correspond to the application designated by the job, and installs the application using the application file and the license file.

14 Claims, 18 Drawing Sheets

(56) References Cited

U.S. PATENT DOCUMENTS

| | | | |
|---|---|---|---|
| 2007/0078972 A1* | 4/2007 | Yagishita | G06F 3/0605 709/224 |
| 2007/0253035 A1* | 11/2007 | Takesada | H04N 1/00395 358/468 |
| 2008/0071689 A1* | 3/2008 | Tabet | G06F 8/60 705/59 |
| 2008/0222043 A1* | 9/2008 | Chefalas | G06F 21/10 705/59 |
| 2009/0020600 A1* | 1/2009 | Akiba | G06F 21/629 235/375 |
| 2009/0288079 A1* | 11/2009 | Zuber | G06F 21/51 717/176 |
| 2010/0079793 A1* | 4/2010 | Nishikawa | G06F 8/65 358/1.15 |
| 2010/0233996 A1* | 9/2010 | Herz | H04L 63/08 455/411 |
| 2010/0321718 A1* | 12/2010 | Mihira | H04N 1/00212 358/1.14 |
| 2012/0062948 A1* | 3/2012 | Nishikawa | G06F 3/1203 358/1.15 |
| 2012/0257248 A1* | 10/2012 | Sato | G06F 8/65 358/1.15 |
| 2013/0111564 A1* | 5/2013 | Jin | H04N 1/4413 726/4 |
| 2013/0207985 A1* | 8/2013 | Kuwano | H04N 1/00 345/531 |
| 2014/0016154 A1* | 1/2014 | Ohmori | H04N 1/00278 358/1.13 |
| 2014/0082608 A1* | 3/2014 | Hayami | G06F 13/12 717/175 |
| 2014/0089391 A1* | 3/2014 | Ryu | H04L 67/42 709/203 |
| 2015/0058630 A1* | 2/2015 | Bae | H04L 9/3239 713/171 |
| 2015/0066424 A1* | 3/2015 | Bae | G06F 1/3206 702/150 |
| 2015/0331646 A1* | 11/2015 | Taniguchi | G06F 3/1203 358/1.15 |

* cited by examiner

FIG. 17

1700 / 1710 — REMOTE MANAGEMENT SYSTEM: CLIENT MANAGEMENT

| CLIENT NAME (1711) | DEVICE ID (1712) | PRODUCT NAME (1713) | STATE (1714) | 1715 / 1716 |
|---|---|---|---|---|
| AAA COMPANY | XXX00001 | iR-ADV 4245 | AWAITING PROCESSING | BROWSE |
|  | XXX00002 | iR-ADV 4235F | AWAITING PROCESSING | BROWSE |
| BBB COMPANY | XXX00003 | iR-ADV 4245 | PROCESSING COMPLETE | BROWSE |
|  | XXX00004 | iR-ADV 4235F | PROCESSING COMPLETE | BROWSE |

1720 — REMOTE MANAGEMENT SYSTEM: DEVICE MANAGEMENT

BASIC INFORMATION

| CLIENT NAME (1721) | DEVICE ID (1722) | PRODUCT NAME (1723) | SYNCHRONIZATION TIME (1724) |
|---|---|---|---|
| AAA | XXX00001 | iR-ADV 4245 | 2015/05/07 10:17 |

APPLICATION INFORMATION 1725 1726 1727  1730 — INSTALL APPLICATION

| APPLICATION ID | APPLICATION NAME | STATE | STATE MANIPULATION |
|---|---|---|---|
| 12bfff3b-012a-1000-b1ef-10e000c4ae6f | APPLICATION A | INSTALLED | START ~1729 |
| 22bfff3b-012a-1000-b1ef-10e000c4ae6f | APPLICATION B | STARTED | START  1728 |
| 32bfff3b-012a-1000-b1ef-10e000c4ae6f | APPLICATION C | STOPPED | START |

1740 / 1741 — REMOTE MANAGEMENT SYSTEM: REGISTRATION OF INSTALLATION JOB

DEVICE ID   XXX00001
PLEASE SELECT APPLICATION TO BE INSTALLED.

[APPLICATION D ▽] ~1742

SETTING FILE PATH [_____] BROWSE... 1745
~1743

1746 — INSTALL

1760 — REMOTE MANAGEMENT SYSTEM: REGISTRATION OF STATE MANIPULATION

1761

| APPLICATION ID | APPLICATION NAME | STATE |
|---|---|---|
| 12bfff3b-012a-1000-b1ef-10e000c4ae6f | APPLICATION A | INSTALLED |

PLEASE SELECT JOB  1762

[START ▽]

SETTING FILE PATH [_____] BROWSE... 1764
~1763

1765 — REGISTER

MANAGEMENT SYSTEM AND INFORMATION PROCESSING APPARATUS MANAGING INSTALLATION AND SETTINGS OF AN APPLICATION

BACKGROUND OF THE INVENTION

Field of the Invention

The present invention relates to a management system, an information processing apparatus, and a non-transitory computer-readable medium.

Description of the Related Art

In recent years, application platforms, typically a Java® platform, have been provided in mobile telephone terminals, multi-function peripherals, and similar information processing apparatuses. Various techniques have been proposed to provide expandable applications by taking advantage of the program portability of Java®. One known example of such techniques to provide expandable applications is the Open Services Gateway initiative (OSGi), which is a Java® application platform for embedded devices.

The OSGi defines a unit of software module management as a "bundle", and defines the specifications for managing a life cycle of a bundle including installed, starting, stopping, and uninstalled. Note that a bundle is an OSGi module unit, and is synonymous with an application in the present invention.

The aforementioned technique enables application life-cycle management, but requires work to change settings of applications and information processing apparatuses (hereinafter, "changing of application-related settings"), which is necessary for the applications to run in harmony with a user environment, to be performed separately. Thus, there is the problem of such work being time consuming to the user.

SUMMARY OF THE INVENTION

In view of the above problem, the present invention aims to improve the efficiency of work related to application management by performing control of application installation and changing of application-related settings simultaneously.

According to one aspect of the present invention, there is provided a management system, comprising: an information processing apparatus; a management apparatus that manages an application for the information processing apparatus; and a distribution apparatus that distributes data related to the application, wherein the information processing apparatus includes: an obtainment unit configured to obtain a job related to the application, from the management apparatus; a control unit configured to control the application for the information processing apparatus in accordance with the job obtained by the obtainment unit; and a setting unit configured to change, along with the control by the control unit, at least one of settings of the information processing apparatus and settings of the application in accordance with setting information included in the job obtained by the obtainment unit, and in a case where the job obtained by the obtainment unit represents an instruction to install the application, the control unit obtains, from the distribution apparatus, an application file and a license file that correspond to the application designated by the job, and installs the application using the application file and the license file.

According to another aspect of the present invention, there is provided an information processing apparatus connected to a management apparatus that performs application management and to a distribution apparatus that distributes application-related data, the information processing apparatus comprising: an obtainment unit configured to obtain an application-related job from the management apparatus; a control unit configured to control an application for the information processing apparatus in accordance with the job obtained by the obtainment unit; and a setting unit configured to change, along with the control by the control unit, at least one of settings of the information processing apparatus and settings of the application in accordance with setting information included in the job obtained by the obtainment unit, wherein in a case where the job obtained by the obtainment unit represents an instruction to install the application, the control unit obtains, from the distribution apparatus, an application file and a license file that correspond to the application designated by the job, and installs the application using the application file and the license file.

According to another aspect of the present invention, there is provided a non-transitory computer-readable medium storing a program that causes a computer to function as: an obtainment unit configured to obtain an application-related job; a control unit configured to control an application for the computer in accordance with the job obtained by the obtainment unit; and a setting unit configured to change, along with the control by the control unit, at least one of settings of the computer and settings of the application in accordance with setting information included in the job obtained by the obtainment unit, wherein in a case where the job obtained by the obtainment unit represents an instruction to install the application, the control unit obtains, from a distribution apparatus, an application file and a license file that correspond to the application designated by the job, and installs the application using the application file and the license file.

The present invention enables control of application installation and changing of application-related settings using one instruction, thereby improving the efficiency of work related to application management.

Further features of the present invention will become apparent from the following description of an exemplary embodiment (with reference to the attached drawings).

BRIEF DESCRIPTION OF THE DRAWINGS

FIG. 17 shows an example of a management system manipulation screen.

DESCRIPTION OF THE EMBODIMENTS

The following describes an embodiment of the present invention with reference to the drawings. Note that the following embodiment depicts, but is not limited to, an example in which a single-body multi-function peripheral having a plurality of functions, such as copy, facsimile, and printer functions, is used as an information processing apparatus. For example, the present invention is applicable to an information processing apparatus that can add and delete applications without stopping a system of a mobile telephone terminal or the like.

[Description of System Configuration]

Figure 1:
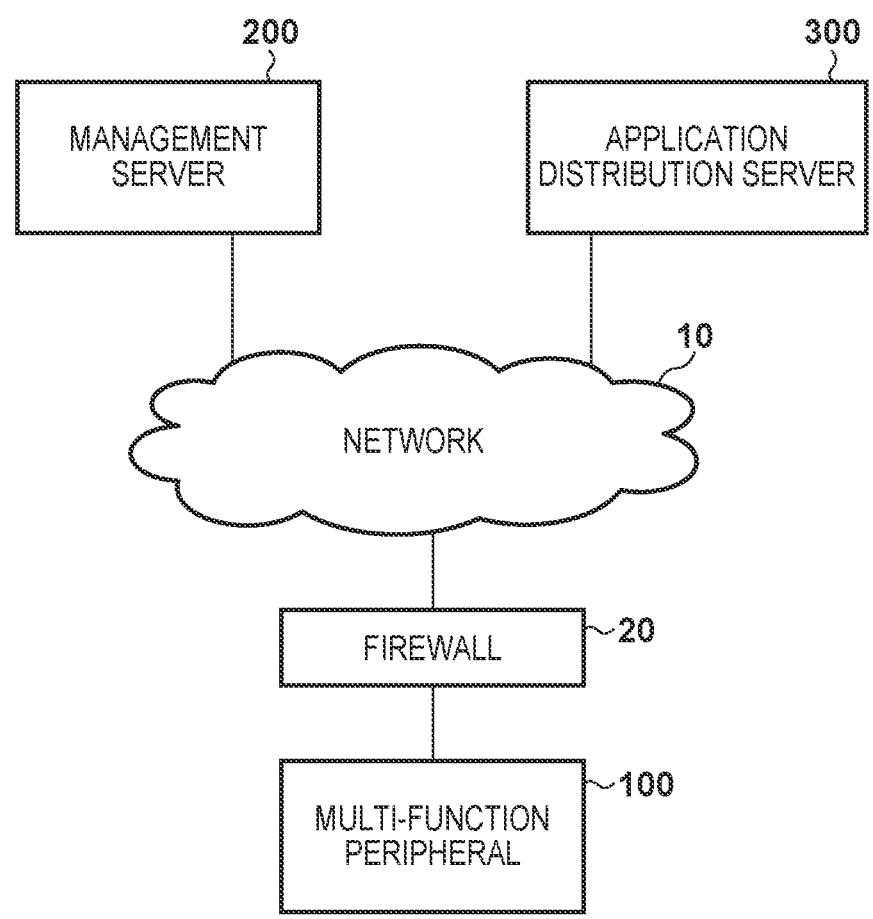
FIG. 1 shows an exemplary configuration of a management system.

FIG. 1 shows an exemplary configuration of a remote management system according to the present embodiment, including a multi-function peripheral serving as an information processing apparatus on which applications can run. In the remote management system according to the present embodiment, a multi-function peripheral 100, a management server 200, and an application distribution server 300 are connected via a network 10, such as the Internet. A firewall 20 is provided between the multi-function peripheral 100 and the network 10. In order to prevent, for example, unauthorized access by a third party, the firewall 20 monitors data that flows through boundaries with external networks, such as public lines and the Internet, and detects/blocks unauthorized access. Although there is one of each type of apparatus in the exemplary configuration shown in FIG. 1, the remote management system is not limited in this way, and the number of each type of apparatus may be more than one. A plurality of multi-function peripherals may be provided in an internal network of one client. Alternatively, one or more multi-function peripherals that are provided in each internal network of a plurality of clients may be managed. Physically, for each server, a plurality of apparatuses may execute management processing in the form of distributed processing.

The multi-function peripheral (MFP) 100 is obtained by integrating a plurality of functions, such as scanner, printer, facsimile, and file transmission functions, into a copy machine. The multi-function peripheral 100 is located in an internal network, such as a local area network (LAN), and is connected to the firewall 20.

The management server 200 remotely manages the multi-function peripheral 100. The management server 200 is placed in, for example, a service center of a company that has developed or sells the multi-function peripheral, and includes a multi-function peripheral management database (not shown) that stores various types of management data. The multi-function peripheral management database stores, for each client, management information related to a multi-function peripheral to be managed on the client side. The management information can specify the multi-function peripheral to be managed and the states of applications, and includes, for example, the configuration of the multi-function peripheral, the type of the multi-function peripheral, a peripheral identification number, information of a location where the multi-function peripheral is placed, and information of installed or uninstalled applications.

Similar to the management server 200, the application distribution server 300 is placed in, for example, the service center of the company that has developed or sells the multi-function peripheral, and includes an application management database (not shown) that manages applications that can be additionally installed to the multi-function peripheral. The application management database stores, for example, the names of the applications, IDs for uniquely identifying the applications (identification information), and information for identifying an authority to use the applications (hereinafter, "application usage right ID"). The application distribution server 300 also has a function of issuing an application usage right ID to a designated application, and a function of issuing a license file necessary for installing an application to the multi-function peripheral.

In order to realize remote management, the remote management system according to the present embodiment has a function of exchanging, with each apparatus, a request and a response with respect to processing related to methods of an application that is mutually implemented, via a remote procedure call (RPC). Furthermore, in order to realize an RPC, the remote management system can use protocols such as hypertext transfer protocol (HTTP) and simple object access protocol (SOAP). Note that the functions and protocols for remote management are not limited to those mentioned above, and other methods and environments may be used.

In the foregoing connection environment, as the firewall 20 is located between the multi-function peripheral 100 and the network 10, a request transmitted directly from the management server 200 to the multi-function peripheral 100 is blocked by the firewall 20. In view of this, at first, a request is transmitted from the multi-function peripheral 100 to the management server 200, and then a request from the management server 200 is included in a response to the transmitted request; taking this measure enables the request from the management server 200 to pass through the firewall 20 and arrive at the multi-function peripheral 100.

[Management Server]

Figure 5:
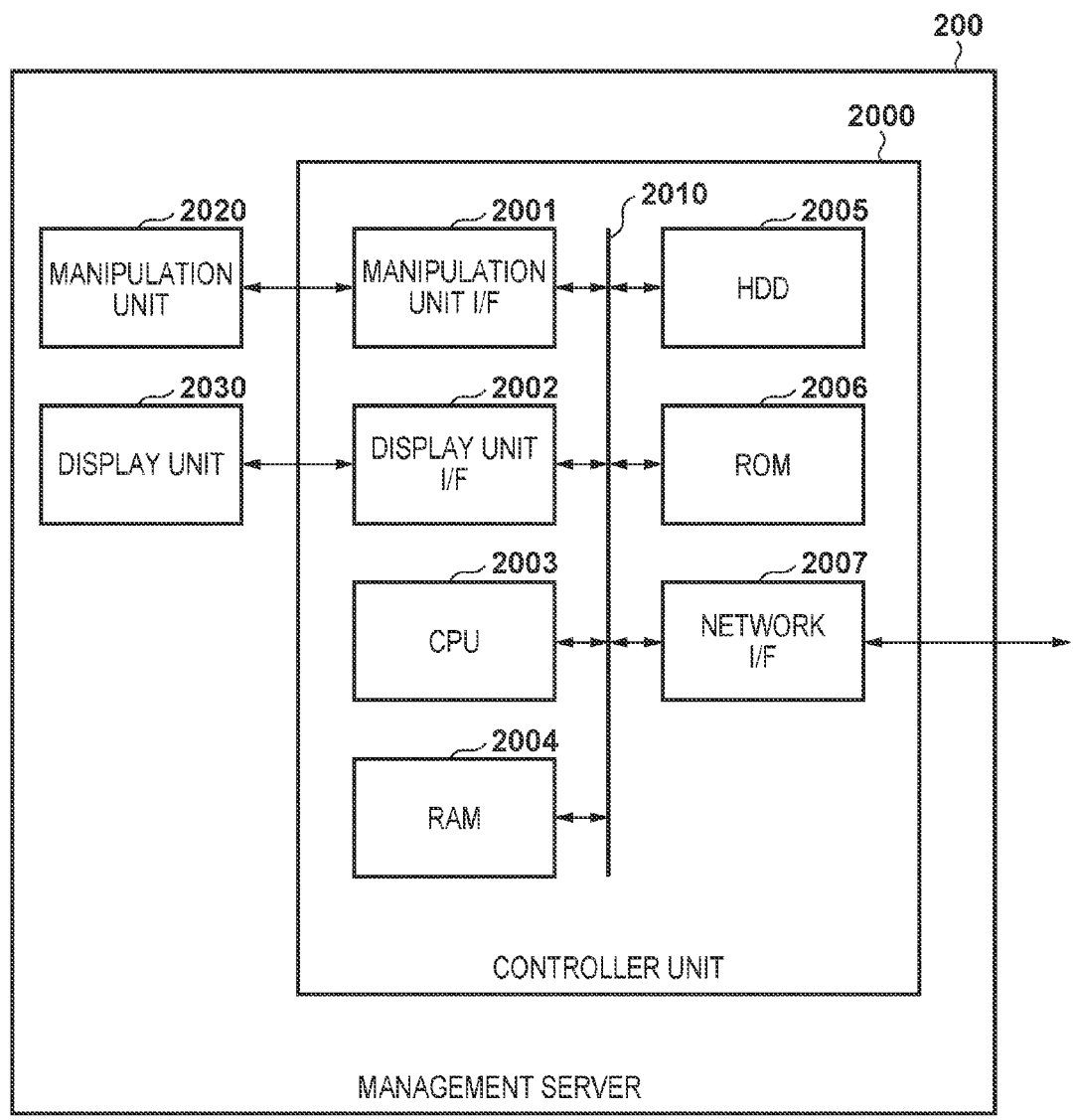
FIG. 5 shows an exemplary hardware configuration of a management server.

FIG. 5 shows an exemplary hardware configuration of the management server 200. The management server 200 includes a controller unit 2000, a manipulation unit 2020, and a display unit 2030.

The controller unit 2000 includes a central processing unit (CPU) 2003 that controls the overall operations of the management server 200. The CPU 2003 starts up an operating system (OS) using a boot program stored in a read-only memory (ROM) 2006. The CPU 2003 also executes various types of processing by executing, on the OS, a management program (not shown) for managing various types of applications, which is stored in a hard disk drive (HDD) 2005. A random-access memory (RAM) 2004 is used as a working memory for the CPU 2003. The HDD 2005 stores the management program, application-related setting job information for instructing the multi-function peripheral to set an application, and the like. Note that in the invention of the present application, an application-related setting job denotes a job that is issued by the management server 200 based on an instruction from a user or the like, for control related to an application for the multi-function peripheral. The above will be described in detail later with reference to FIGS. 17 and 18.

The ROM 2006, the RAM 2004, a manipulation unit I/F 2001, a display unit I/F 2002, and a network I/F 2007 are connected to a system bus 2010. The manipulation unit I/F 2001 is an interface with the manipulation unit 2020, which includes a pointing device, a keyboard, and the like, and transmits information input from the user via the manipulation unit 2020 to the CPU 2003. The display unit I/F 2002 outputs, to the display unit 2030, screen data to be displayed on the display unit 2030, which includes a display and the like. The network I/F 2007 exchanges data with an external apparatus connected to the management server 200 via the network 10.

[Application Distribution Server]

Figure 6:
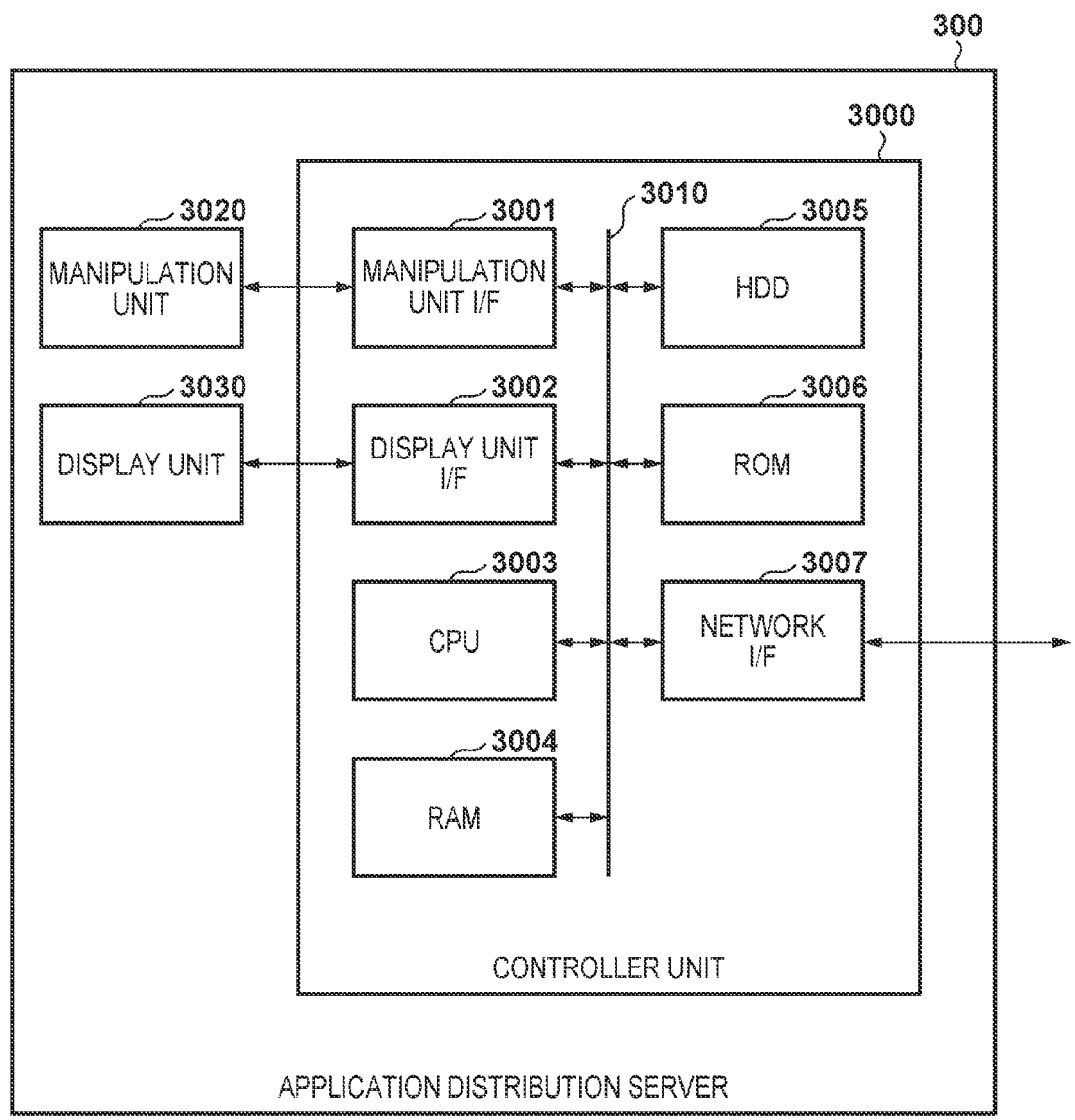
FIG. 6 shows an exemplary hardware configuration of an application distribution server.

FIG. 6 shows an exemplary hardware configuration of the application distribution server 300. Although it is assumed that the basic hardware configuration thereof is the same as that of the management server 200, no restriction is intended in this regard. The application distribution server 300 includes a controller unit 3000, a manipulation unit 3020, and a display unit 3030.

The controller unit 3000 includes a CPU 3003 that controls the overall operations of the application distribution server 300. The CPU 3003 starts up an OS using a boot program stored in a ROM 3006. The CPU 3003 also executes various types of processing by executing, on the OS, an application distribution program (not shown) for distributing various types of applications, which is stored in an HDD 3005. A RAM 3004 is used as a working memory for the CPU 3003. The HDD 3005 stores the application distribution program, information related to distributable applications, and the like.

The ROM 3006, the RAM 3004, a manipulation unit I/F 3001, a display unit I/F 3002, and a network I/F 3007 are connected to a system bus 3010. The manipulation unit I/F 3001 is an interface with the manipulation unit 3020, which includes a pointing device, a keyboard, and the like, and transmits information input from a user via the manipulation unit 3020 to the CPU 3003. The display unit I/F 3002 outputs, to the display unit 3030, screen data to be displayed on the display unit 3030, which includes a display and the like. The network I/F 3007 exchanges data with an external apparatus connected to the application distribution server 300 via the network 10.

The application distribution server 300 accepts, as an application obtainment request from the multi-function peripheral 100, an identification number and an application usage right ID of the multi-function peripheral 100. In response, the application distribution server 300 returns, to the multi-function peripheral 100, an application file of an application corresponding to the application usage right ID and a license file necessary for installing the application.

[Hardware Configuration of Multi-Function Peripheral]

Figure 2:
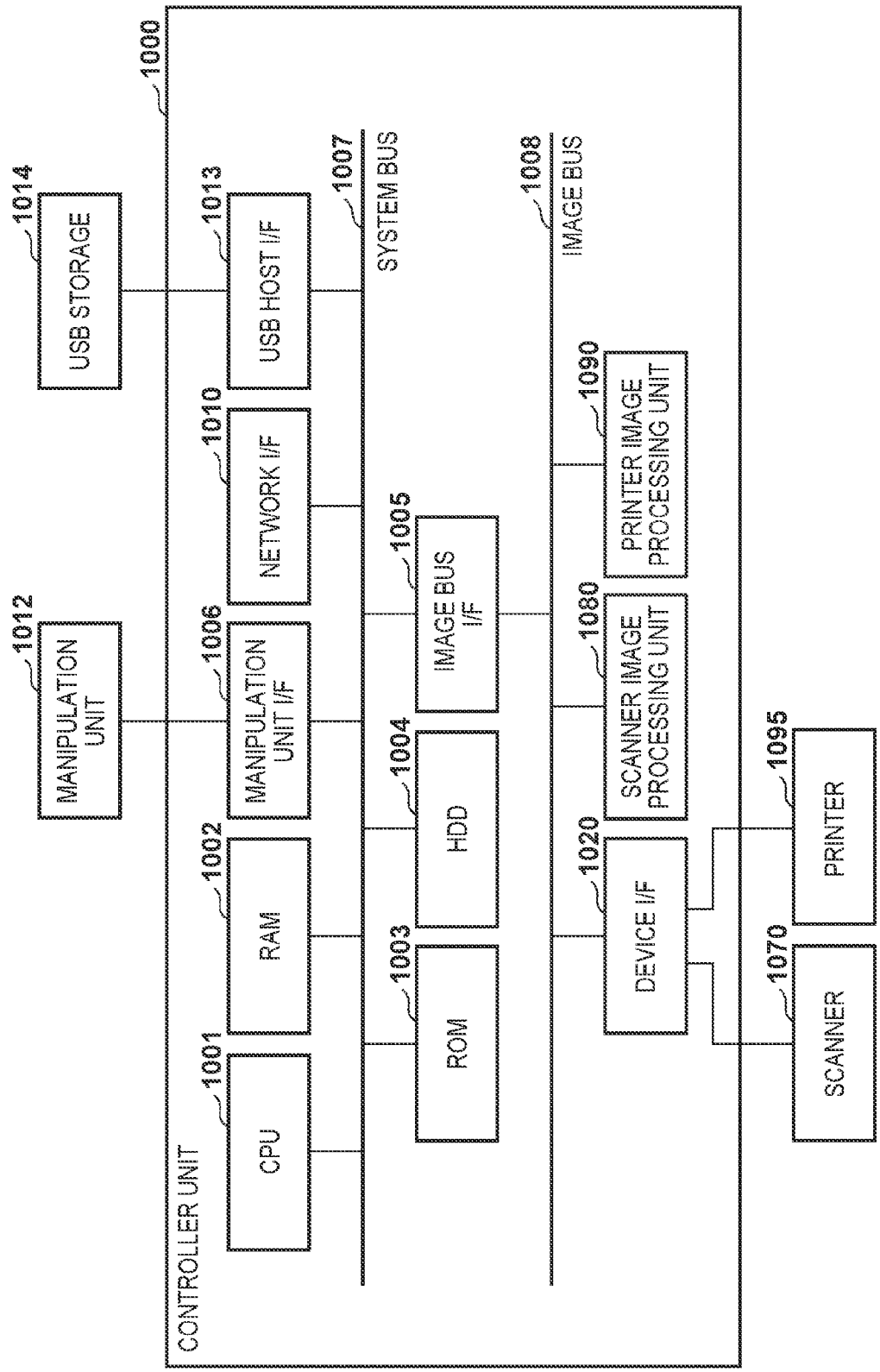
FIG. 2 shows an exemplary hardware configuration of a multi-function peripheral.

FIG. 2 shows an exemplary hardware configuration of the multi-function peripheral 100. The multi-function peripheral 100 includes a controller unit 1000. A scanner 1070 serving as an image input device, a printer 1095 serving as an image output device, and a manipulation unit 1012 for accepting a manipulation made by a user are connected to the controller unit 1000.

The controller unit 1000 performs, for example, control for realizing a copy function for producing a printout of image data read by the scanner 1070, using the printer 1095. The controller unit 1000 includes a CPU 1001. The CPU 1001 starts up an OS using a boot program stored in a ROM 1003. The CPU 1001 also executes various types of processing by executing, on the OS, programs stored in an HDD 1004. A RAM 1002 is used as a working area for the CPU 1001. The RAM 1002 provides not only the working area, but also an image memory area for temporarily storing image data. The HDD 1004 stores various types of programs and image data.

The ROM 1003, the RAM 1002, a manipulation unit I/F 1006, a network I/F 1010, a USB host I/F 1013, and an image bus I/F 1005 are connected to the CPU 1001 via a system bus 1007. The manipulation unit I/F 1006 is an interface with the manipulation unit 1012, which includes a touchscreen, and outputs image data to be displayed on the manipulation unit 1012 to the manipulation unit 1012. The manipulation unit I/F 1006 is an interface for sending, to the CPU 1001, information input by a user via the manipulation unit 1012. The network I/F 1010 is an interface for establishing connection between the multi-function peripheral 100 and the external networks.

The USB host I/F 1013 is an interface for communicating with a USB storage 1014. The USB host I/F 1013 is an interface for outputting data stored in the HDD 1004 to the USB storage 1014. The USB host I/F 1013 also obtains data stored in the USB storage 1014, and passes the obtained data to the CPU 1001. A plurality of USB devices, including the USB storage 1014, can be connected to the USB host I/F 1013. The USB storage 1014 is an external storage apparatus that stores data, and is attachable to and removable from the USB host I/F 1013.

The image bus I/F 1005 is a bus bridge for establishing a connection between the system bus 1007 and an image bus 1008 that transfers image data at high speed, and for converting a data format. For example, the image bus 1008 is constituted by a PCI bus or in accordance with an IEEE 1394. A device I/F 1020, a scanner image processing unit 1080, and a printer image processing unit 1090 are provided on the image bus 1008.

The scanner 1070 and the printer 1095 are connected to the device I/F 1020, and the device I/F 1020 applies synchronous/asynchronous conversion to image data. The scanner image processing unit 1080 corrects, processes, and edits input image data. The printer image processing unit 1090 corrects printout image data, converts the resolution of the printout image data, and so on in accordance with the printer 1095.

[Software Configuration of Multi-Function Peripheral]

Figure 3:
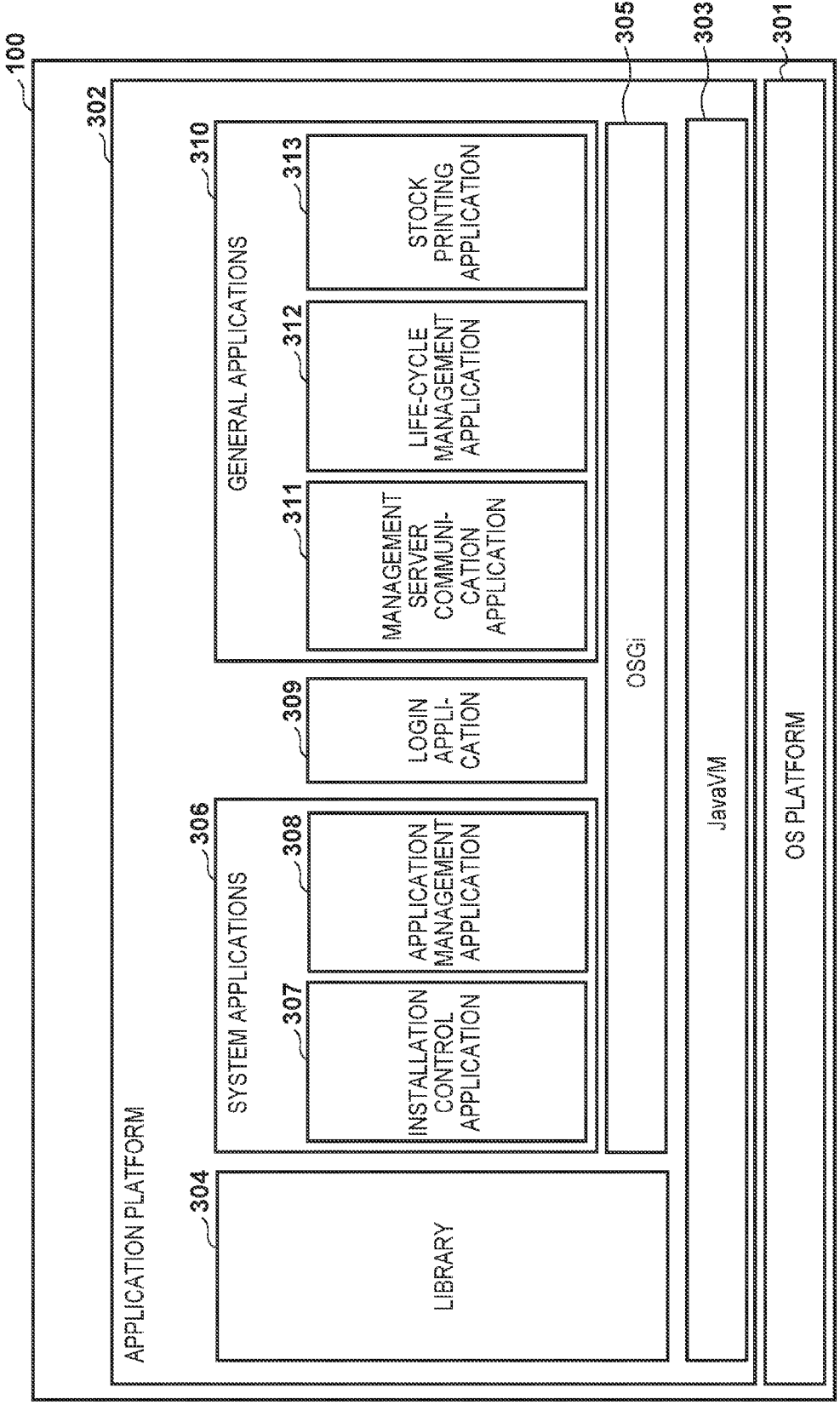
FIG. 3 shows an exemplary software configuration of the multi-function peripheral.

FIG. 3 shows an exemplary software configuration of the multi-function peripheral 100. Note that each item of software according to the present embodiment is stored in the ROM 1003 or the HDD 1004, and executed by the CPU 1001. Various types of information that are used at execution are stored in the RAM 1002 or the HDD 1004, and exchanged between software functions. Communication with an external apparatus is performed using the network I/F 1010.

The multi-function peripheral 100 includes an OS platform 301, and an application platform 302 is configured on the OS platform 301. The application platform 302 is configured as a runtime environment for a Java VM 303, and composed of the Java VM 303 as an interpreter, a library 304, an OSGi framework 305, and system applications 306.

The library 304 is composed of a Java® standard application programming interface (API) library. The OSGi framework 305 is a module for implementing the OSGi specifications. The OSGi framework 305 allows a plurality of applications to run on the single Java VM 303, performs application life-cycle management, and provides an inter-application communication function and the like.

The system applications 306 collectively refer to applications that are preinstalled in the multi-function peripheral 100 for managing general applications 310 and providing an API as a service when the general applications 310 manipulate the multi-function peripheral 100. A description is given below of an installation control application 307 and an application management application 308 as examples of the system applications 306.

The installation control application 307 is an application for managing an application that is not described in the OSGi specifications and a license to use that application in association with each other. The installation control application 307 executes, for example, processing for decrypting an encrypted Java® application file using key information included in a license file, and installing the Java application file in the OSGi framework 305.

The application management application 308 provides a manipulation screen for installing, starting, stopping, and uninstalling an application, as a web page, using the installation control application 307. The screen provided by the application management application 308 can be used via, for example, a browser (not shown) that is installed in a management PC (not shown) connected to the same LAN as the multi-function peripheral 100. Examples of the screen provided by the application management application 308 will be described later with reference to FIG. 4.

A login application 309 identifies a user of the multi-function peripheral 100, and provides other applications with information including a user name and an email address of the user who is currently logged into the multi-function peripheral 100. The general applications 310 collectively refer to applications for expanding the functions of the multi-function peripheral 100 running on the application platform 302.

A management server communication application 311 is an application for communicating with the management server 200 and obtaining application-related setting job information. When the remote management system includes a plurality of management servers, one of the management servers from which the application-related setting job information is obtained may be set in advance, and communication may be performed based on that setting.

A life-cycle management application 312 obtains the application-related setting job information from the management server 200 using the management server communication application 311, and configures settings in accordance with the application-related setting job information. Similar to the application management application 308, the life-cycle management application 312 uses the installation control application 307 when changing the states of applications.

A stock printing application 313 is an application for temporarily storing print jobs within the multi-function peripheral 100, and enabling printing of only necessary print jobs while print settings are checked on a screen (not shown) displayed on the manipulation unit 1012 of the multi-function peripheral 100. The stock printing application 313 imports and uses print jobs that have been input to the multi-function peripheral 100 as print jobs of the stock printing application 313. Therefore, although settings need not be changed on the print job input side, it is necessary to change the settings of the multi-function peripheral 100 so as not to print the print jobs. This enables the user to achieve stock printing using the stock printing application 313. Meanwhile, printing cannot be performed by directly inputting print jobs to the multi-function peripheral 100 unless such settings to disable printing of the print jobs are reversed. Note that the stock printing application 313 will be referred to in a later description as an exemplary target for application life-cycle management.

Figure 7:
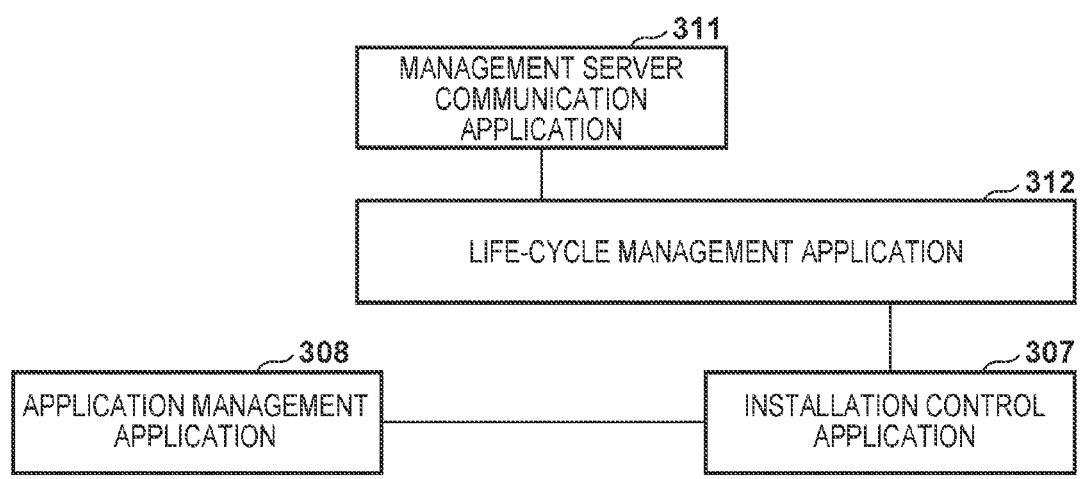
FIG. 7 shows a relationship between various types of applications.

FIG. 7 shows a relationship between the application management application 308, the installation control application 307, the management server communication application 311, and the life-cycle management application 312 in the multi-function peripheral 100.

[Application Life-Cycle Management]

A client, or a worker who belongs to, for example, the company that sells the multi-function peripheral 100, accesses the multi-function peripheral 100 using a browser installed in a PC (not shown) of a hub (internal network) of the client. Consequently, application life-cycle management can be performed using the application management application 308. The following describes application management using the application management application 308 with reference to FIG. 4. The states of applications, as well as relationships between applications and licenses, will also be described.

Figure 4:
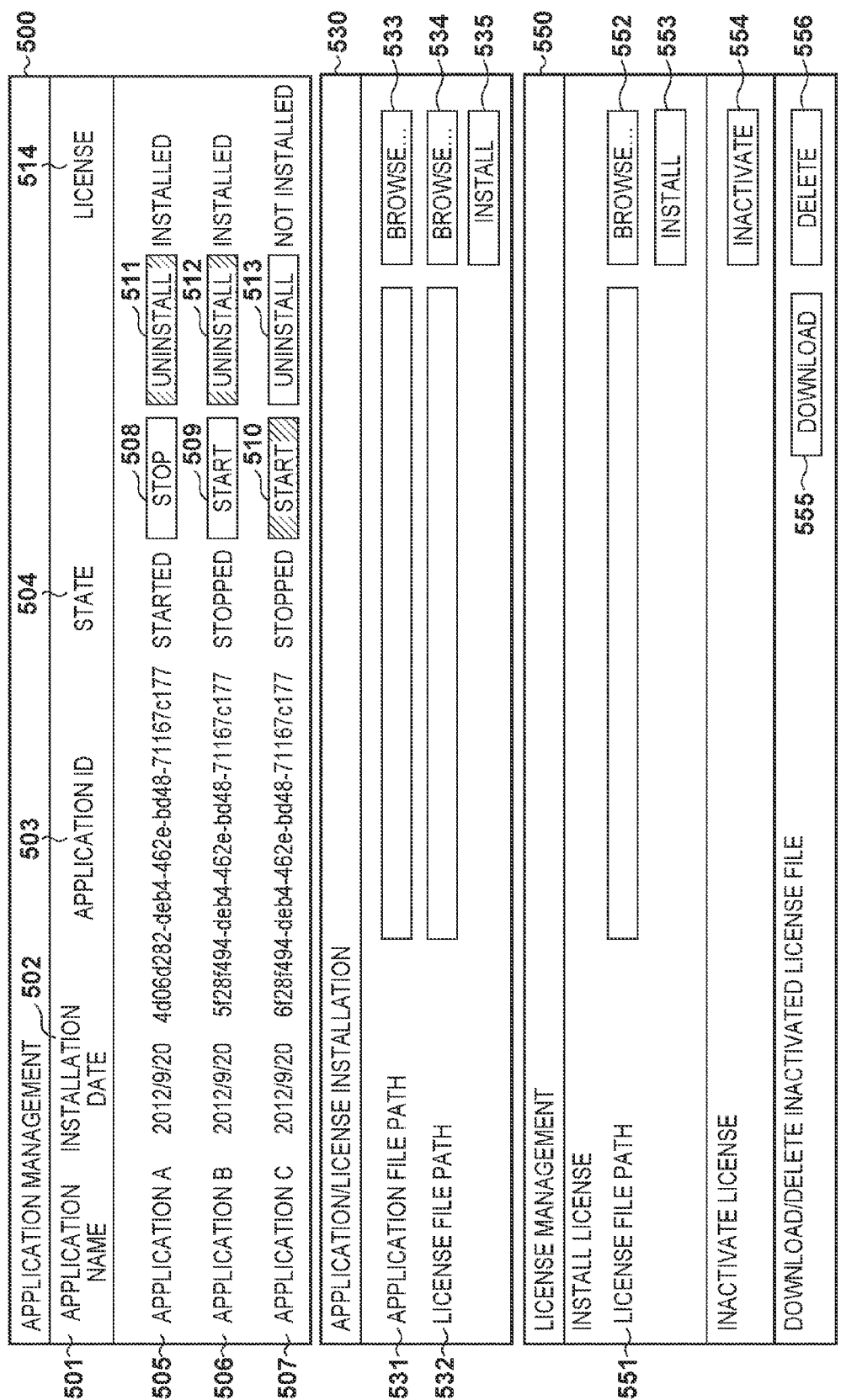
FIG. 4 shows an exemplary structure of an application management screen.

FIG. 4 shows an application management screen 500, an installation screen 530, and a license management screen 550 provided by the application management application 308. The application management screen 500 enables manipulation of the states of applications installed in the multi-function peripheral 100. The installation screen 530 enables installation of a new application in the multi-function peripheral 100. The license management screen 550 enables manipulation of the states of licenses of applications installed in the multi-function peripheral 100.

First, the application management screen 500 will be described. In the present example, the following three applications are managed: an application A 505, an application B 506, and an application C 507.

An application name 501 shows the names of applications that are installed in the multi-function peripheral 100 using the installation control application 307. An installation date 502 shows the installation date of the applications in the multi-function peripheral 100. An application ID 503 shows IDs (identification information) that are uniquely allocated to the applications. Note that the IDs allocated to the applications are shared in the remote management system according to the invention of the present application. A state 504 shows the states of the applications. Specifically, it shows "started" if the applications are in a started state, and "stopped" if the applications are in a stopped state. A license 514 shows the states of licenses of the applications. Specifically, it shows "installed" if the licenses are in an installed state, and "not installed" if the licenses are in an inactivated or deleted state.

Buttons 508 to 510 are instruction buttons for switching between start and stop of the applications. Specifically, they are displayed as stop buttons if the applications are in the started state, and as start buttons if the applications are in the stopped state. Pressing the button 508 of the application in the started state ("application A 505" in the present example) will change the state 504 of that application to "stopped". On the other hand, pressing the button 509 of the application in the stopped state ("application B 506" in the present example) will change the state 504 of that application to "started".

In the present example, control is performed in such a manner that the button 510 is inactivated and hence cannot be pressed, because the corresponding license is not installed. With such control, starting of an application whose license is not installed is disabled.

An uninstall button 513 is an instruction button for uninstalling the corresponding application. Pressing the uninstall button 513, which corresponds to the application C 507, will uninstall the application C 507. At this time, data including setting information generated by the application C 507 is also deleted simultaneously. Uninstall buttons 511, 512 are inactivated, thereby indicating that the corresponding applications cannot be uninstalled, because the corresponding applications are in the started state, or in the stopped state with their licenses remaining in the installed state.

The installation screen 530 will now be described. Pressing a browse button 533 will display a screen (not shown) for designating a file path to a location where an application file is stored. Once the application file has been designated via the screen, the path to the application file is input to an input area of an application file path 531.

In general, an application file is encrypted for security and business reasons. Therefore, installation of an application requires a license file including key information for decrypting an encrypted application file. Pressing a browse button 534 on the installation screen 530 will display a screen (not shown) for designating a file path to a location where a license file is stored. Similar to application designation, once the license file has been designated via the screen, the path to the license file is input to an input area of a license file path 532.

Pressing an installation button 535 will start installation of the application file designated by the application file path 531, as well as the license file designated by the license file path 532.

The license management screen 550 will now be described. The license management screen 550 is provided for installed applications, on a per-application basis. Pressing a browse button 552 will display a screen (not shown) for designating a file path to a location where a license file is stored. Once the path to the license file has been designated via the displayed screen, the path to the license file is input to an input area of a license file path 551. Pressing an installation button 553 will start installation of a license using the license file designated by the license file path 551. An application that cannot be started because its license is not installed can be started by additionally installing the license.

An inactivation button 554 enables inactivation of the license. In order to inactivate the license, the corresponding application needs to be in the stopped state. When the license has an expiration date, e.g., when the license is "valid only for 30 days", inactivation of the license enables delay of expiration of the license. Therefore, even if the license has been inactivated, its license file is continuously stored. In inactivating the license, the consumption status of the license at the time of inactivation may be stored.

A download button 555 enables downloading of the inactivated license. A downloaded license file can be reinstalled only in a multi-function peripheral that has downloaded the license file. That is to say, a downloaded license can be controlled to disable transfer thereof to other multi-function peripherals. A delete button 556 enables deletion of the inactivated license. If the inactivated license is deleted without being downloaded, a license file needs to be newly acquired and installed to restart the corresponding application. Here, an inquiry may be made to the management server 200 or the like to automatically authenticate the user or multi-function peripheral.

[External Application Management]

Applications are externally managed by an operator who belongs to, for example, the company that sells the multi-function peripheral 100, using a browser (not shown) installed in, for example, a PC (not shown) placed in the company that sells the multi-function peripheral 100. Specifically, in order to control an application of the remote multi-function peripheral 100, the operator accesses a management system manipulation screen provided by the management server 200, and registers an application-related setting job in the management server 200. Then, the management server communication application 311 and the life-cycle management application 312, which have been installed in the remote multi-function peripheral 100, obtain the registered job through periodic polling, and update the settings of the multi-function peripheral 100 in accordance with an instruction of the job so that the settings reflect the registered job.

FIG. 17 shows an exemplary structure of the management system manipulation screen provided by the management server 200. A management system manipulation screen 1700 serves as a screen for registering application-related jobs. The management system manipulation screen 1700 includes a client management screen 1710, a multi-function peripheral management screen 1720, an installation setting screen 1740, and a state manipulation setting screen 1760. The client management screen 1710 enables management of clients and multi-function peripherals owned by the clients. The multi-function peripheral management screen 1720 enables management of information of the multi-function peripherals and the states of applications that can be installed in the multi-function peripherals. The installation setting screen 1740 enables settings of installation of applications. The state manipulation setting screen 1760 enables settings of state manipulation with respect to applications.

The client management screen 1710 is composed of a client name 1711, a device ID 1712, a product name 1713, a state 1714, and browse buttons 1715. The client name 1711 shows the names of the clients. The device ID 1712 shows IDs (identification information) for uniquely identifying the multi-function peripherals operating on the clients' side. The product name 1713 shows the product names of the multi-function peripherals operating on the clients' side. The state 1714 shows the state of manipulation applied to the multi-function peripherals operating on the clients' side. These states include "awaiting processing" and "processing complete". "Awaiting processing" denotes a state from registration of an application-related setting job until completion of setting processing in the corresponding multi-function peripheral, whereas "processing complete" denotes a state in which the corresponding multi-function peripheral has given notice of the state of the corresponding application after completion of the setting processing. The browse buttons 1715 enable transition to the multi-function peripheral management screen 1720 that corresponds to each of the devices identified by the device IDs.

The multi-function peripheral management screen 1720 is provided for each multi-function peripheral, and displayed upon pressing of detail buttons 1716 on the client management screen 1710. In the example of FIG. 17, the multi-function peripheral management screen corresponds to a multi-function peripheral (100) to which a device ID "XXX00001" is allocated. The multi-function peripheral management screen 1720 includes a client name 1721, a device ID 1722, a product name 1723, synchronization time 1724, an application ID 1725, an application name 1726, a state 1727, a state manipulation 1728, state manipulation buttons 1729, and an application installation button 1730.

The client name 1721 shows the name of the client who owns the multi-function peripheral. The device ID 1722 shows an ID (identification information) for uniquely identifying the multi-function peripheral. The product name 1723 shows the product name of the multi-function peripheral. The synchronization time 1724 shows the time of notification of the states of applications for the multi-function peripheral.

The application ID 1725 shows IDs (identification information) for uniquely identifying applications that are installed or scheduled to be installed in the multi-function peripheral. Note that the application IDs are shared in the remote management system according to the invention of the present application, and correspond to the application IDs 503 shown in FIG. 4. The application name 1726 shows the names of the applications that are installed or scheduled to be installed in the multi-function peripheral. The state 1727 shows the states of the applications that are installed or scheduled to be installed in the multi-function peripheral. The state manipulation 1728 shows buttons indicating state manipulations that can be applied to the applications that are installed or scheduled to be installed in the multi-function peripheral. The state manipulation buttons 1729 enable transition to the state manipulation setting screen 1760. An application installation button 1730 enables transition to the installation setting screen 1740.

The installation setting screen 1740 includes a device ID 1741, an application selection pull-down 1742, a setting file path 1743, a browse button 1745, and a registration button 1746.

The device ID 1741 shows an ID (identification information) for uniquely identifying a multi-function peripheral that is to select an application to be installed. The application selection pull-down 1742 is a pull-down menu for selecting an application that can be installed in the multi-function peripheral identified by the device ID. The names of new applications that can be installed are displayed, in a selectable manner, in the application selection pull-down 1742. The names of applications that are already installed are not displayed. Alternatively, in order to clearly indicate that such applications are already installed, the names of such applications may be displayed in a list of unselectable applications. This prevents a user from erroneously selecting an application that is already installed. After an application to be installed has been selected, the name of the selected application is displayed.

The setting file path 1743 displays a path to a location where a setting file is stored. The browse button 1745 enables selection of the setting file by displaying a screen (not shown) for selecting the path to the location where the setting file is stored. Once the setting file has been designated via the screen that is displayed upon pressing of the browse button 1745, the path to the location where the setting file is stored is input to an input area of the setting file path 1743. Note that the setting file stores information for changing the settings of the application and the multi-function peripheral. For example, in the case of the aforementioned stock printing application 313, the setting file includes information for configuring settings that disable printing of received print jobs, and as-needed settings of the application.

The registration button 1746 enables registration of an installation job for installing the selected application.

[Application-Related Setting Job and Application Information]

Figure 18:
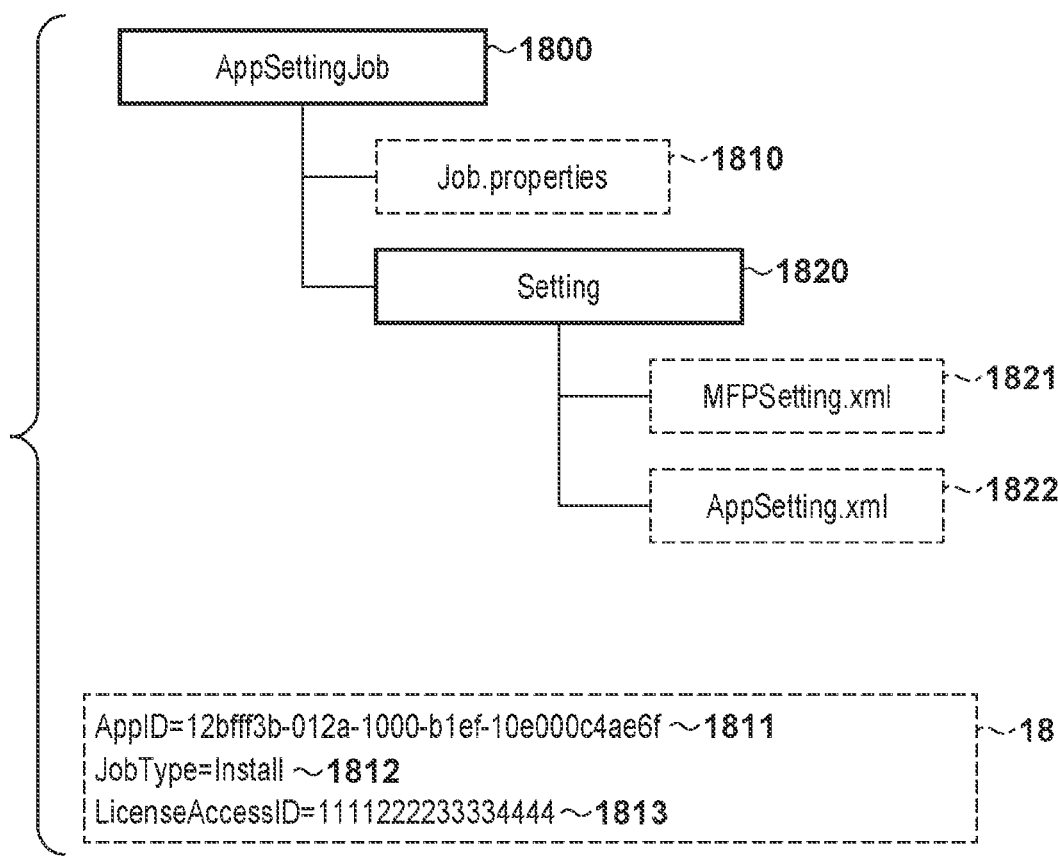
FIG. 18 shows an exemplary data structure of an application-related setting job.

FIG. 18 shows an exemplary data structure of an application-related setting job registered in the management server 200. An application-related setting job 1800 is composed of job properties 1810 and a setting file 1820.

The job properties 1810 are fundamental properties of the application-related setting job. The job properties 1810 are composed of an application ID 1811, a job type 1812, and an application usage right ID 1813. The application ID 1811 is an ID of an application whose state is to be manipulated. The job type 1812 is the type of the application-related setting job. A setting value indicating the type of the application-related setting job is "install" in the case of an installation job, "start" in the case of a start job, "stop" in the case of a stop job, "update" in the case of an update job, and "uninstall" in the case of an uninstallation job. Application-related processing is executed on the multi-function peripheral side based on this value designated in accordance with the type of the job.

The application usage right ID 1813 is necessary for obtaining the application from the application distribution server 300. This information is required only in the case of the installation job. That is to say, the application usage right ID is information used in installing the corresponding application.

The setting file 1820 is used to change settings of the multi-function peripheral and the application. When there is no need to change settings of the multi-function peripheral and the application along with changing of the state of the application, the setting file 1820 may not be provided. The setting file 1820 includes a multi-function peripheral setting file 1821 and an application setting file 1822. Note that both or only one of the multi-function peripheral setting file 1821 and the application setting file 1822 may be provided as needed.

Figure 19:
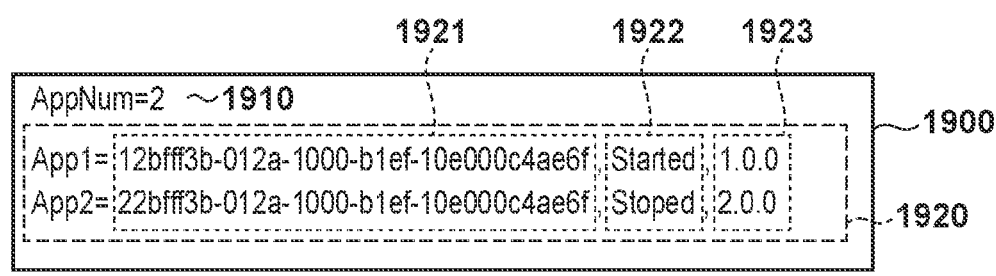
FIG. 19 shows an example of application information.

FIG. 19 shows an exemplary structure of application information transmitted from the multi-function peripheral 100 to the management server 200. This application information enables the management server 200 to recognize the states of applications for the multi-function peripheral 100. Application information 1900 includes application quantity information 1910 and individual application information 1920.

The application quantity information 1910 indicates the number of applications managed by the life-cycle management application 312. The individual application information 1920 is information of the applications managed by the life-cycle management application 312. The individual application information 1920 includes application ID information 1921, state information 1922, and version information 1923. The application ID information 1921 shows IDs (identification information) for uniquely identifying the applications. The state information 1922 shows the states of the applications. Specifically, it shows "Started" in the case of the started state, "Stopped" in the case of the stopped state, and "Installed" in the case of the installed state. The version information 1923 shows the versions of the applications. It is assumed that the versions of distributed applications, together with the past update statuses of the applications and information of the latest versions, are managed on the management server 200 side and the application distribution server 300 side.

Figure 8:
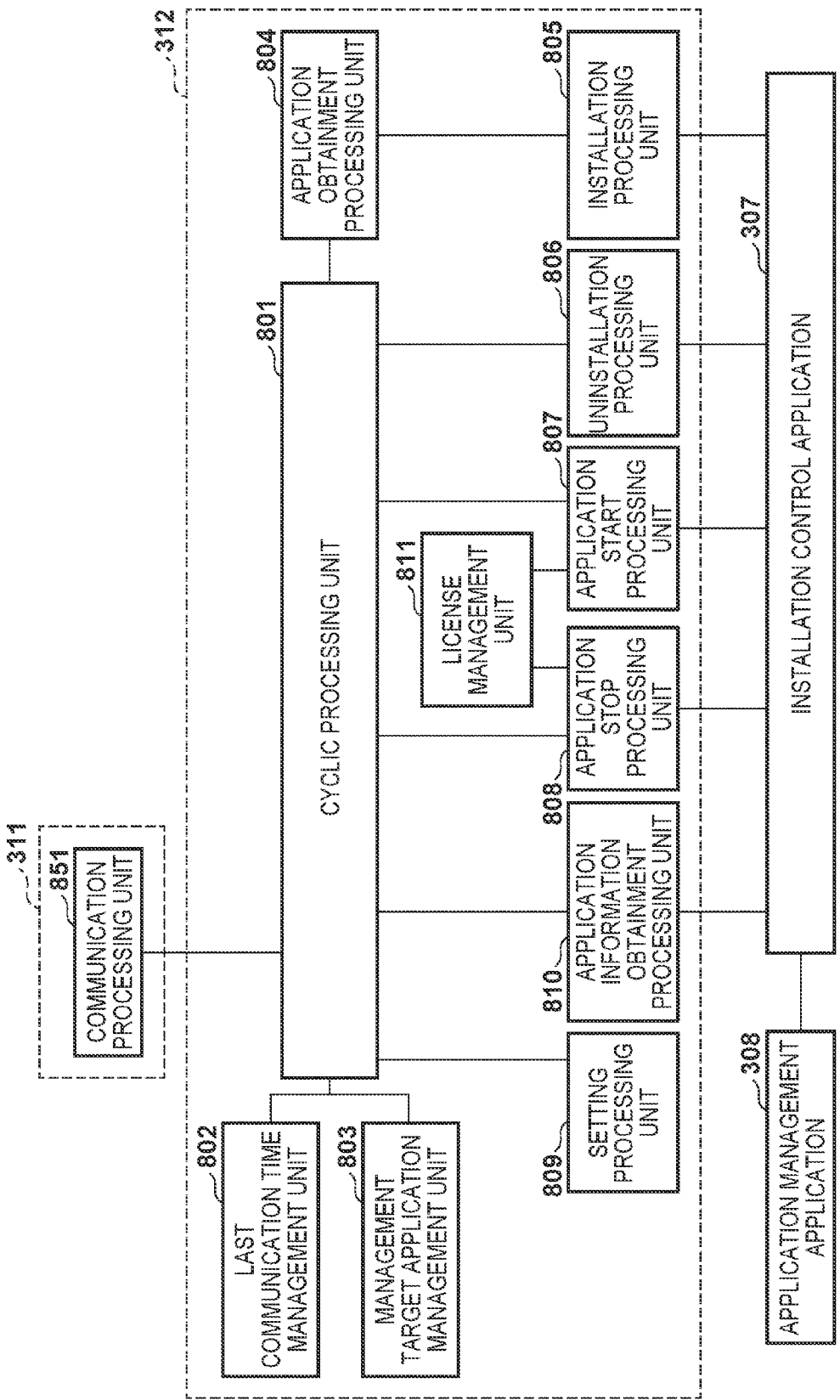
FIG. 8 is a diagram for describing details of various types of applications for the multi-function peripheral.

FIG. 8 shows the details of the management server communication application 311 and the life-cycle management application 312. Note that the elements for realizing the functions of applications are realized by the CPU 1001 reading out and executing the programs that are stored in the HDD 1004 or the like in correspondence with the applications. The operations of these elements will be described later with reference to flowcharts.

The management server communication application 311 includes a communication processing unit 851. The communication processing unit 851 communicates with the management server 200 using the HTTP or a similar protocol, and receives application-related setting job information from the management server 200 via a response. The communication processing unit 851 also transmits information of applications installed in the multi-function peripheral 100.

The life-cycle management application 312 includes a cyclic processing unit 801, a last communication time management unit 802, a management target application management unit 803, an application obtainment processing unit 804, an installation processing unit 805, an uninstallation processing unit 806, an application start processing unit 807, an application stop processing unit 808, and a setting processing unit 809.

The cyclic processing unit 801 periodically communicates with the management server 200 using the communication processing unit 851 included in the management server communication application 311. When the cyclic processing unit 801 has received the application-related setting job information, it configures settings of the multi-function peripheral 100 in accordance with the application-related setting job information. When the cyclic processing unit 801 has not been able to communicate with the management server 200 for a certain period, it stops an application that was installed in accordance with the application-related setting job information received from the management server 200.

The last communication time management unit 802 stores information of the date and time of the last successful communication with the management server 200. The management target application management unit 803 stores information that uniquely identifies the application that was installed in accordance with the application-related setting job information received from the management server 200. The application obtainment processing unit 804 communicates with the application distribution server 300 using the HTTP or a similar protocol, and obtains an application file and a license file from the application distribution server 300. The installation processing unit 805 installs the application file and the license file in the multi-function peripheral 100 using the installation control application 307.

The uninstallation processing unit 806 uninstalls applications and licenses from the multi-function peripheral 100 using the installation control application 307. The application start processing unit 807 starts applications in the stopped state using the installation control application 307. The application stop processing unit 808 stops applications in the started state using the installation control application 307. An application that has been stopped by the application stop processing unit 808 cannot be started by the application management application 308. That is to say, when the application stop processing unit 808 has stopped an application installed in the multi-function peripheral in accordance with an application-related setting job registered on the management server 200 side, the application cannot be started by an instruction from the multi-function peripheral side. In this case, this application can be restarted in accordance with an application-related setting job for a starting purpose registered on the management server 200 side.

The setting processing unit 809 imports setting information included in the application-related setting job information into the multi-function peripheral 100, and changes settings of the multi-function peripheral 100. An application information obtainment processing unit 810 obtains information of applications that are installed using the installation control application 307. A license management unit 811 stores license files that have been exported by the application stop processing unit 808 using the installation control application 307.

[Processing Flows]
(Polling Processing)

Figure 9:
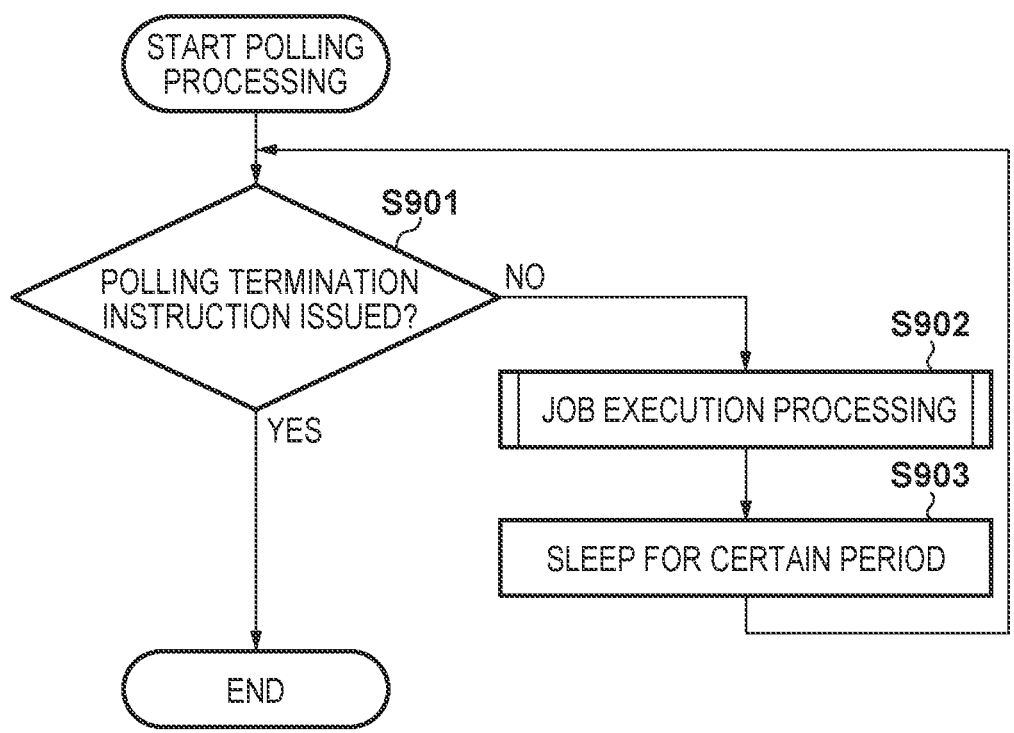
FIG. 9 is a flowchart showing a flow of polling processing.

FIG. 9 is a flowchart showing the flow of polling processing in which the multi-function peripheral 100 side periodically attempts to obtain an application-related setting job from the management server 200 (hereinafter, simply "polling"). It is assumed that a polled party and a polling interval (sleep period) are set in advance as setting values in the communication processing unit 851. Settings related to polling may be, for example, set in advance and changed as needed by the company that has developed or sells the multi-function peripheral.

In step S901, the cyclic processing unit 801 determines whether a polling termination instruction has been issued. If a polling termination instruction has been issued (YES of step S901), the present processing flow ends. If not (NO of step S901), the present processing flow proceeds to step S902.

In step S902, the cyclic processing unit 801 executes application-related setting job execution processing. The details of this processing will be described later with reference to FIG. 10.

In step S903, the cyclic processing unit 801 sleeps for a certain period, and then the present processing flow proceeds to step S901.

(Application-Related Setting Job Execution Processing)

Figure 10:
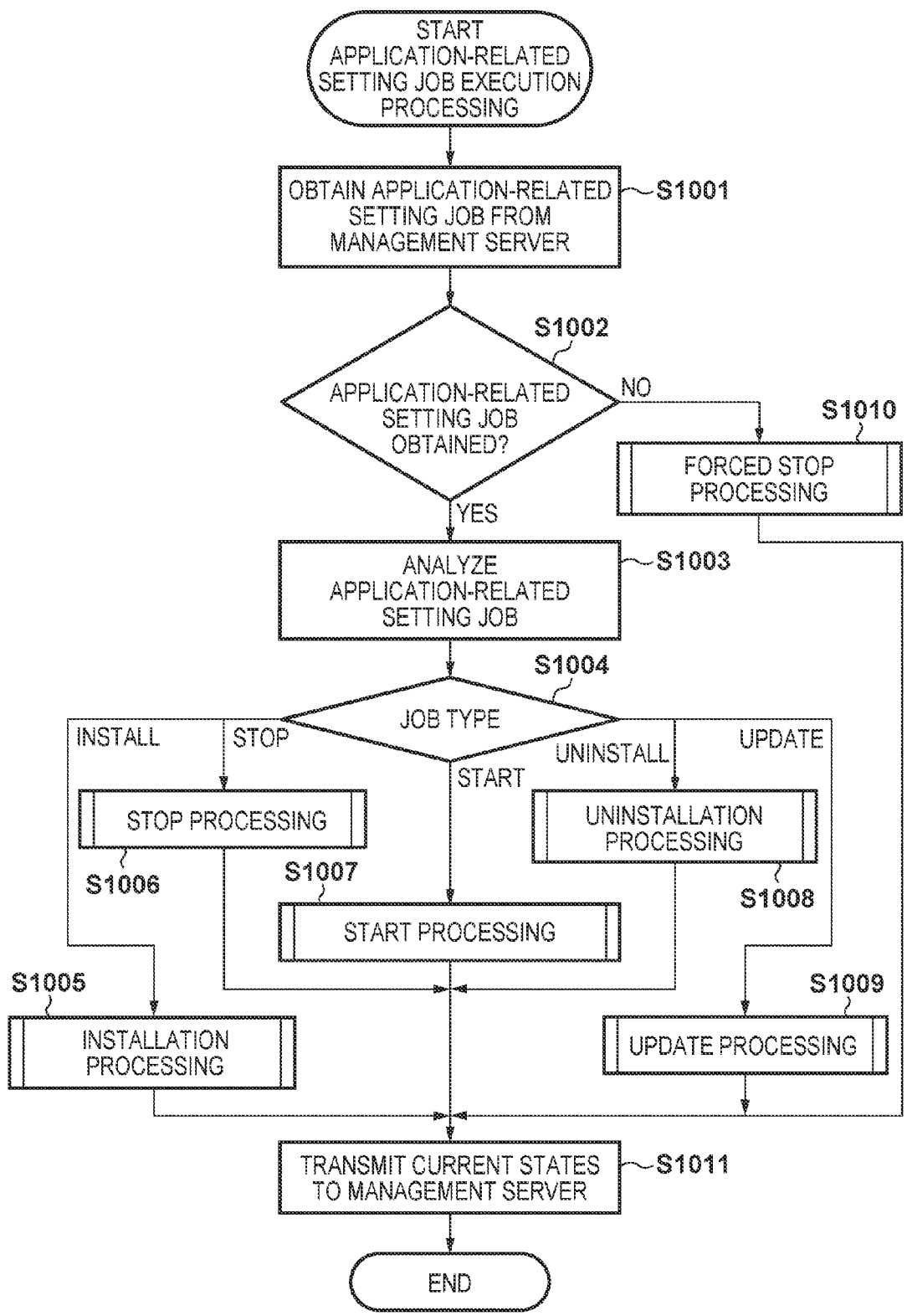
FIG. 10 is a flowchart showing a flow of application-related setting job execution processing.

FIG. 10 is a flowchart showing the flow of the application-related setting job execution processing. This processing corresponds to the processing of step S902 in FIG. 9.

In step S1001, the cyclic processing unit 801 attempts to obtain new application-related setting job information from the management server 200 by polling the management server 200 using the communication processing unit 851.

In step S1002, the cyclic processing unit 801 determines whether the application-related setting job information has been obtained in step S1001. If the application-related setting job information has been obtained (YES of step S1002), the present processing flow proceeds to step S1003; if not (NO of step S1002), the present processing flow proceeds to step S1010.

In step S1003, the cyclic processing unit 801 analyzes the application-related setting job information that the communication processing unit 851 received from the management server 200.

In step S1004, the cyclic processing unit 801 determines the type (job type 1812) of a job designated by the application-related setting job information. If the job is an installation job, the present processing flow proceeds to step S1005. If the job is a stop job, the present processing flow proceeds to step S1006. If the job is a start job, the present processing flow proceeds to step S1007. If the job is an uninstallation job, the present processing flow proceeds to step S1008. If the job is an update job, the present processing flow proceeds to step S1009.

In step S1005, the cyclic processing unit 801, the application obtainment processing unit 804, and the installation processing unit 805 execute installation processing. The details of this processing will be described later with reference to FIG. 11. Thereafter, the present processing flow proceeds to step S1011.

In step S1006, the cyclic processing unit 801 and the application stop processing unit 808 execute stop processing. The details of this processing will be described later with reference to FIG. 12. Thereafter, the present processing flow proceeds to step S1011.

In step S1007, the cyclic processing unit 801 and the application start processing unit 807 execute start processing. The details of this processing will be described later with reference to FIG. 13. Thereafter, the present processing flow proceeds to step S1011.

In step S1008, the cyclic processing unit 801 and the uninstallation processing unit 806 execute uninstallation processing. The details of this processing will be described later with reference to FIG. 16. Thereafter, the present processing flow proceeds to step S1011.

In step S1009, the cyclic processing unit 801 executes update processing. The details of this processing will be described later with reference to FIG. 15. Thereafter, the present processing flow proceeds to step S1011.

In step S1010, the cyclic processing unit 801 and the application stop processing unit 808 execute forced stop processing. The details of this processing will be described later with reference to FIG. 14. Thereafter, the present processing flow proceeds to step S1011.

In step S1011, the cyclic processing unit 801 obtains information of installed applications using the application information obtainment processing unit 810, and transmits the information of the applications to the management server 200 using the communication processing unit 851. In this way, the multi-function peripheral 100 notifies the management server 200 of the latest application information of the multi-function peripheral 100. Thereafter, the present processing flow ends.

(Installation Processing)

Figure 11:
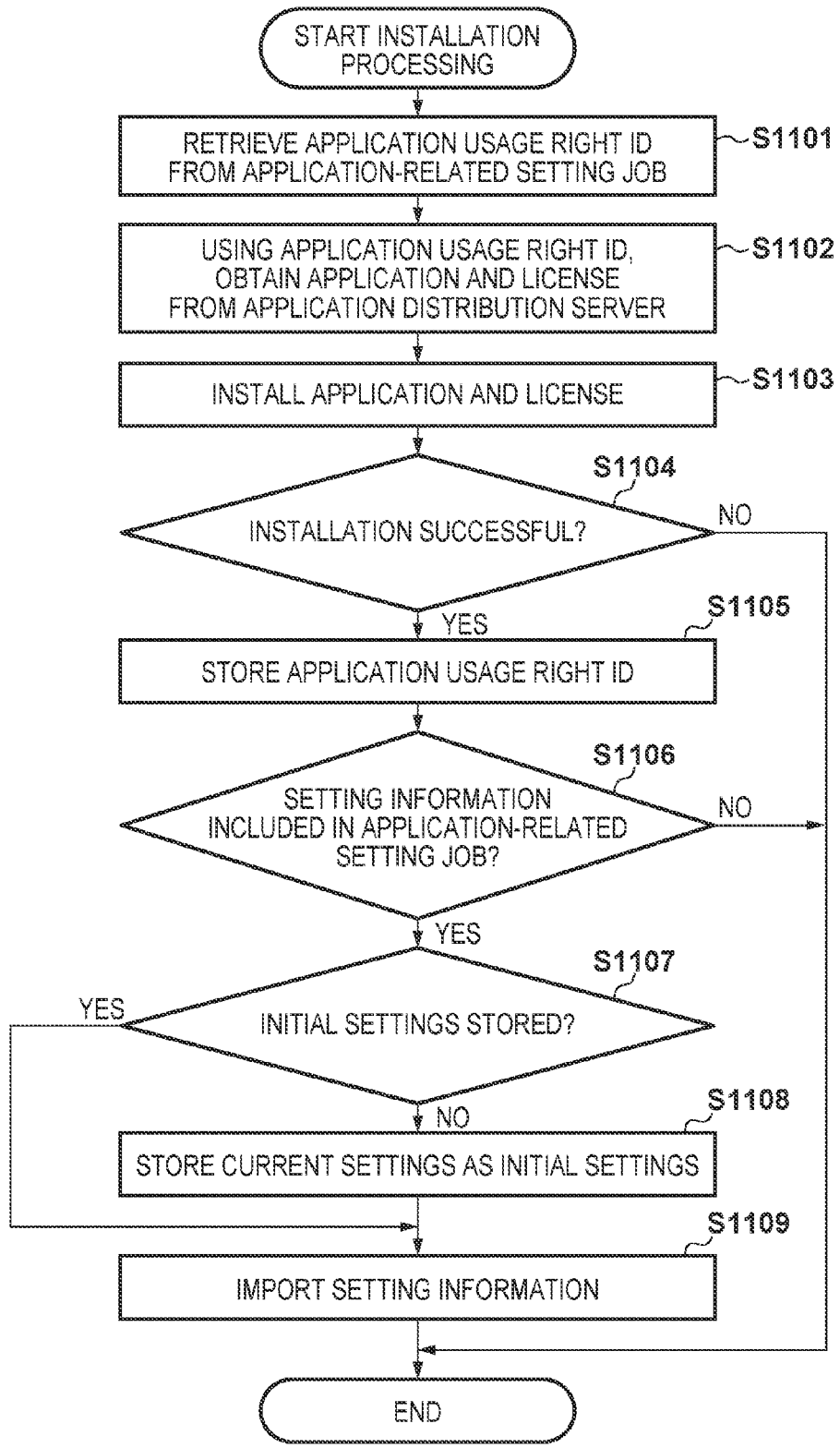
FIG. 11 is a flowchart showing a flow of installation processing.

FIG. 11 is a flowchart showing the flow of the installation processing. This processing corresponds to the processing of step S1005 in FIG. 10.

In step S1101, the cyclic processing unit 801 retrieves an application usage right ID from the application-related setting job information, and passes the application usage right ID to the application obtainment processing unit 804.

In step S1102, using the application usage right ID received from the cyclic processing unit 801, the application obtainment processing unit 804 obtains an application file and a license file from the application distribution server 300, and passes the application file and the license file to the installation processing unit 805. At this time, the application distribution server 300 distributes the application file and the license file corresponding to the application usage right ID to the multi-function peripheral 100 in reply to a request transmitted from the multi-function peripheral 100 including the application usage right ID. When the application usage right ID is unauthorized, the application distribution server 300 may give notice of its unauthorized state.

In step S1103, using the installation control application 307, the installation processing unit 805 installs the application file and the license file received from the application obtainment processing unit 804.

In step S1104, the cyclic processing unit 801 determines whether the installation processing in step S1103 has been successful. If the installation has been successful (YES of step S1104), the present processing flow proceeds to step S1105; if not (NO of step S1104), the present processing flow ends.

In step S1105, the cyclic processing unit 801 stores identification information (application ID) and the application usage right ID of the installed application to the management target application management unit 803.

In step S1106, the cyclic processing unit 801 determines whether the application-related setting job information includes setting information (setting file 1820). If the setting information is included (YES of step S1106), the present processing flow proceeds to step S1107; if not (NO of step S1106), the present processing flow ends.

In step S1107, the cyclic processing unit 801 determines whether initial settings are stored. Note that the initial settings denote settings prior to implementation of settings based on the application-related setting job information received from the management server 200. If the initial settings are stored (YES of step S1107), the present processing flow proceeds to step S1109; if not (NO of step S1107), the present processing flow proceeds to step S1108.

In step S1108, the cyclic processing unit 801 obtains and stores the current settings using the setting processing unit 809. Here, the current settings are stored to, for example, the HDD 1004 of the multi-function peripheral 100, and before the settings are changed, pre-change settings are stored. Note that related information, such as the date and time settings were changed, may be stored as well.

In step S1109, using the setting processing unit 809, the cyclic processing unit 801 imports the setting information included in the application-related setting job information, and changes the settings of the multi-function peripheral 100. Thereafter, the present processing flow ends.

Through the foregoing processing, an application can be installed in the multi-function peripheral 100 by remotely registering an application-related setting job for an installation purpose.

(Stop Processing)

Figure 12:
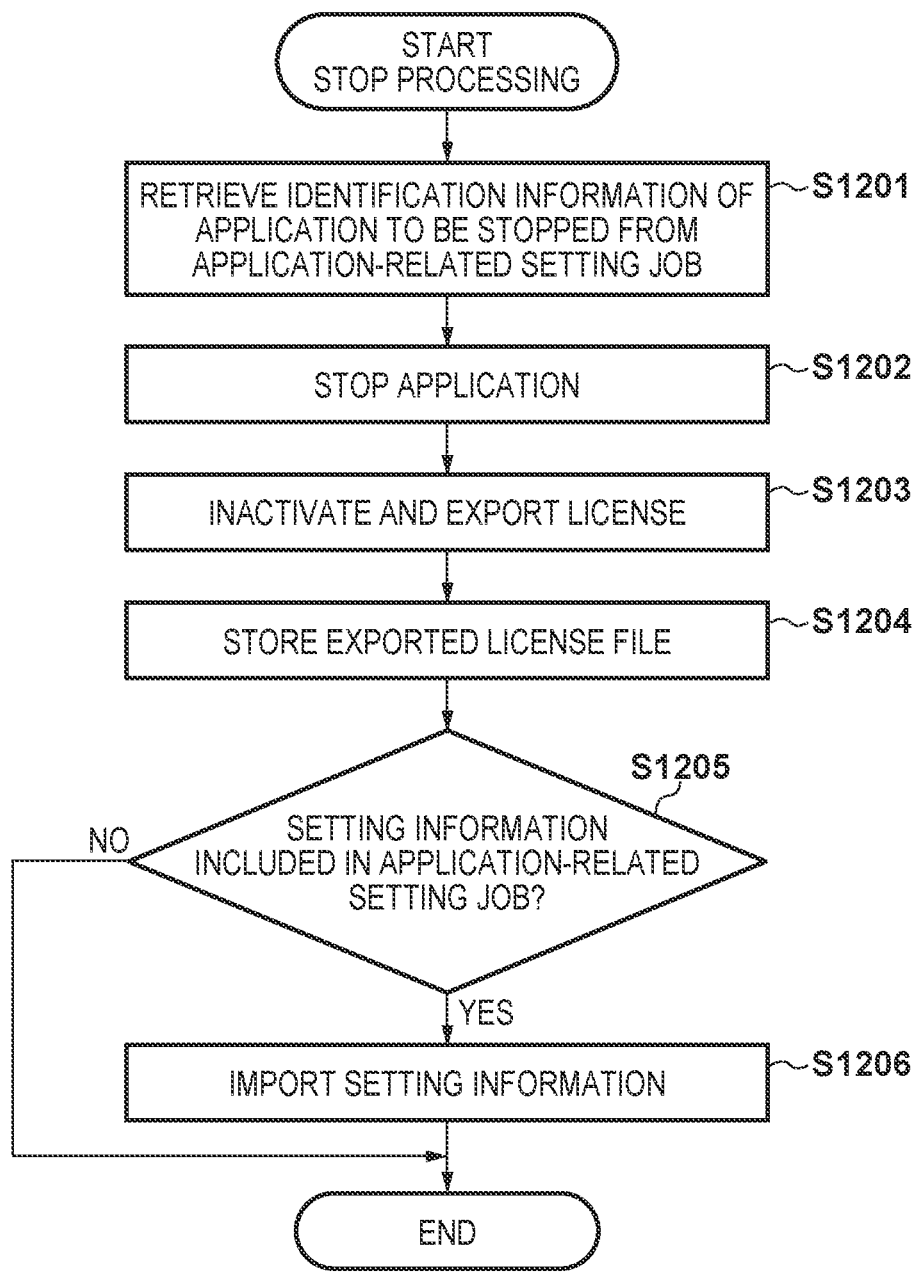
FIG. 12 is a flowchart showing a flow of stop processing.

FIG. 12 is a flowchart showing the flow of the stop processing. This processing corresponds to the processing of step S1006 in FIG. 10.

In step S1201, the cyclic processing unit 801 retrieves, from the application-related setting job information, identification information (application ID) of the application to be stopped, and passes the identification information to the application stop processing unit 808.

In step S1202, the application stop processing unit 808 places the application identified by the identification information received from the cyclic processing unit 801 in the stopped state.

In step S1203, using the installation control application 307, the application stop processing unit 808 inactivates and exports the license of the application placed in the stopped state.

In step S1204, the application stop processing unit 808 passes and stores the license file exported in step S1203 to the license management unit 811. The inactivated and stored license file is installed and rendered usable again only when the stopped application is started again by an application-related setting job obtained from the management server 200.

In step S1205, the cyclic processing unit 801 determines whether the application-related setting job information includes setting information (setting file 1820). If the setting information is included (YES of step S1205), the present processing flow proceeds to step S1206; if not (NO of step S1205), the present processing flow ends.

In step S1206, using the setting processing unit 809, the cyclic processing unit 801 imports the setting information included in the application-related setting job information, and changes the settings of the multi-function peripheral 100. Thereafter, the present processing flow ends.

Through the foregoing processing, an application running on the multi-function peripheral 100 can be placed in the stopped state by remotely registering an application-related setting job for a stopping purpose. Once the application has been placed in the stopped state using this method, its license is temporarily placed in an uninstalled state; this prevents starting of the application on the multi-function peripheral 100 side using the application management application 308.

(Start Processing)

Figure 13:
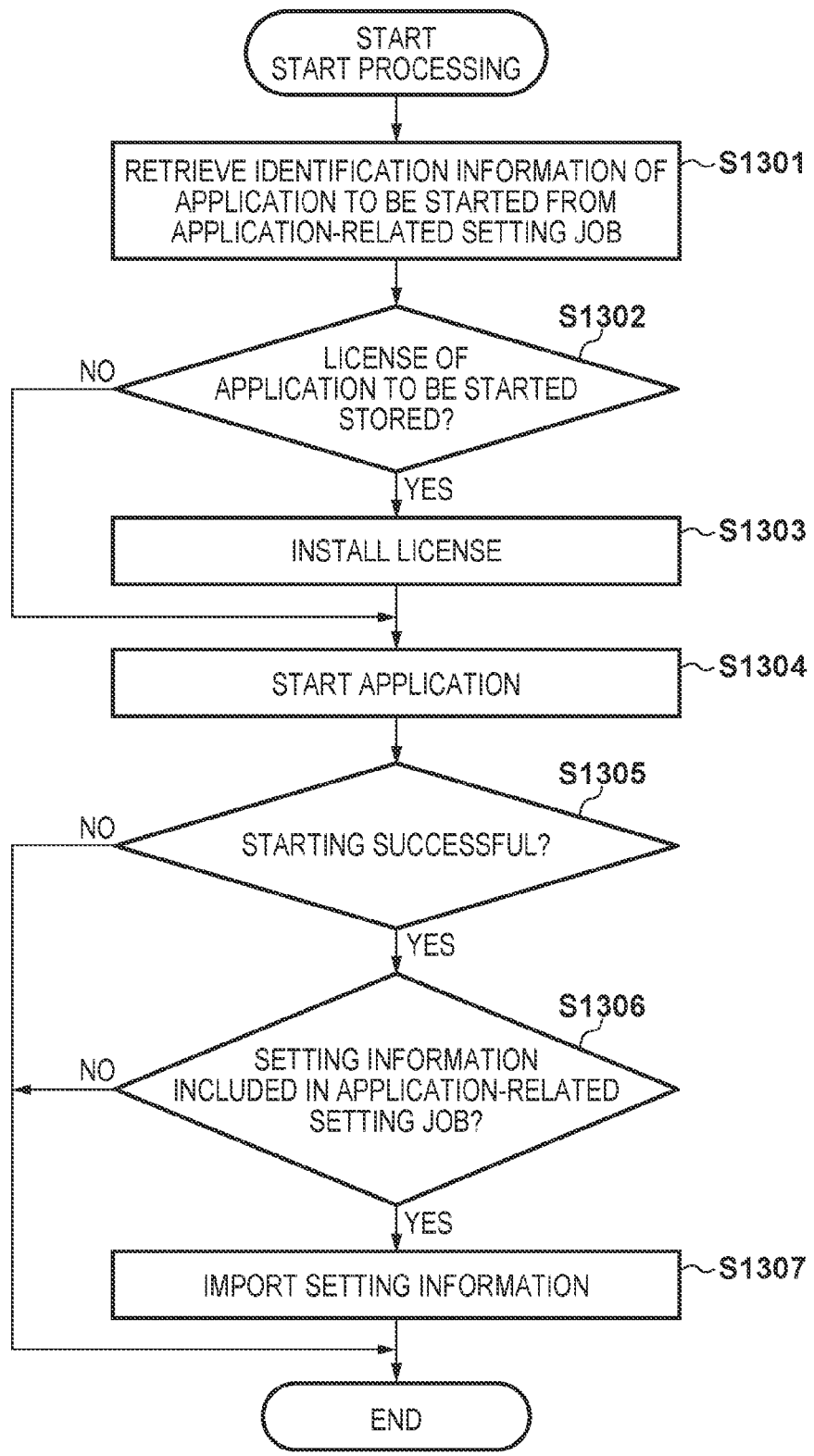
FIG. 13 is a flowchart showing a flow of start processing.

FIG. 13 is a flowchart showing the flow of the start processing. This processing corresponds to the processing of step S1007 in FIG. 10.

In step S1301, the cyclic processing unit 801 retrieves, from the application-related setting job information, identification information (application ID) of the application to be started, and passes the identification information to the application start processing unit 807.

In step S1302, the application start processing unit 807 passes the identification information received from the cyclic processing unit 801, i.e., the identification information of the application to be started, to the license management unit 811, and determines whether a license file of the application to be started is stored. If the license file is stored (YES of step S1302), the present processing flow proceeds to step S1303; if not (NO of step S1302), the present processing flow proceeds to step S1304. The license file is stored if, for example, it was stored in step S1204 of FIG. 12 upon placing the application in the stopped state.

In step S1303, the application start processing unit 807 obtains the license file of the application to be started from the license management unit 811, and installs the license file using the installation control application 307.

In step S1304, using the installation control application 307, the application start processing unit 807 places the application to be started, which is identified by the identification information received from the cyclic processing unit 801, i.e., the identification information of the application to be started, in the started state. If the license is not stored, starting of the application fails.

In step S1305, the cyclic processing unit 801 determines whether the start processing in step S1304 has been successful. If the starting process has been successful (YES of step S1305), the present processing flow proceeds to step S1306; if not (NO of step S1305), the present processing flow ends.

In step S1306, the cyclic processing unit 801 determines whether the application-related setting job information includes setting information. If the setting information is included (YES of step S1306), the present processing flow proceeds to step S1307; if not (NO of step S1306), the present processing flow ends.

In step S1307, using the setting processing unit 809, the cyclic processing unit 801 imports the setting information included in the application-related setting job information, and changes the settings of the multi-function peripheral 100. Thereafter, the present processing flow ends.

Through the foregoing processing, an application that is installed in the multi-function peripheral 100 but is in the stopped state can be placed in the started state by remotely registering an application-related setting job for a starting purpose.

(Forced Stop Processing)

Figure 14:
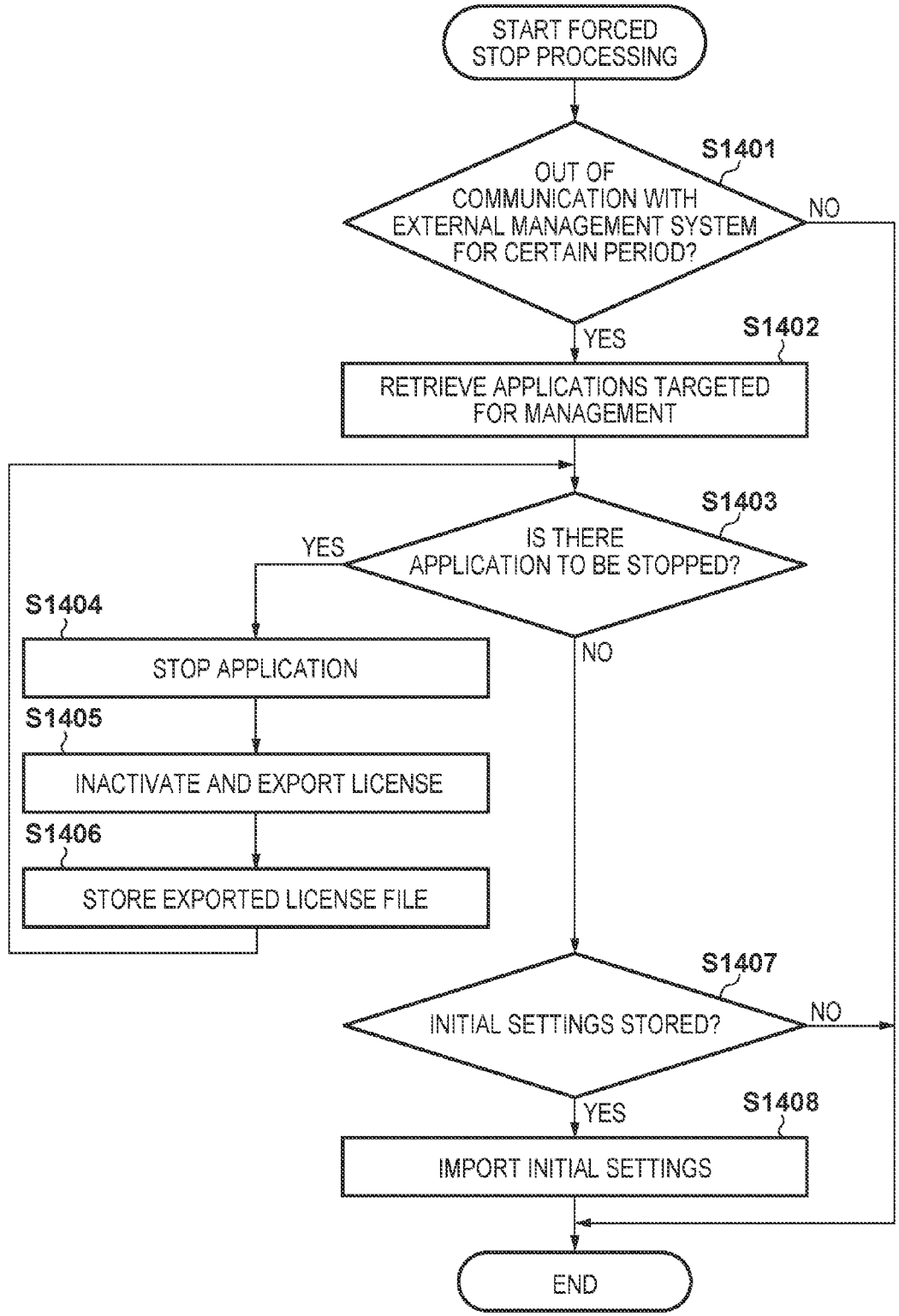
FIG. 14 is a flowchart showing a flow of forced stop processing.

FIG. 14 is a flowchart showing the flow of the forced stop processing. This processing corresponds to the processing of step S1010 in FIG. 10.

In step S1401, the cyclic processing unit 801 obtains, from the last communication time management unit 802, information of the date and time of the last successful communication with the management server 200, and calculates a period from the last successful communication with the management server 200 to the current date and time based on the current date and time. Then, the cyclic processing unit 801 determines whether the calculated period exceeds a predetermined threshold (e.g., 30 days). If the threshold is exceeded (YES of step S1401), the present processing flow proceeds to step S1402; if not (NO of step S1401), the present processing flow ends. This threshold related to the period may be set in advance and changed as needed by, for example, the company that has developed or sells the multi-function peripheral.

In step S1402, the cyclic processing unit 801 obtains, from the management target application management unit 803, a list of information that identifies applications that have been installed based on application-related setting job information obtained from the management server 200, and passes the list to the application stop processing unit 808. Specifically, this list is a list of application IDs (hereinafter, "application list").

In step S1403, the application stop processing unit 808 determines whether the applications indicated by the application list received from the cyclic processing unit 801 include an application to which the stop processing has not yet been applied. If the application to which the stop processing has not yet been applied is included (YES of step S1403), the present processing flow proceeds to step S1404; if not (NO of step S1403), the present processing flow proceeds to step S1407.

In step S1404, the application stop processing unit 808 places the applications indicated by the application list received from the cyclic processing unit 801 in the stopped state.

In step S1405, using the installation control application 307, the application stop processing unit 808 inactivates and exports the licenses of the applications placed in the stopped state.

In step S1406, the application stop processing unit 808 passes and stores the license files exported in step S1405 to the license management unit 811.

In step S1407, the cyclic processing unit 801 determines whether initial settings are stored. If the initial settings are stored (YES of step S1407), the present processing flow proceeds to step S1408; if not (NO of step S1407), the present processing flow ends. The initial settings are stored if the settings were stored in step S1108 of the installation processing shown in FIG. 11.

In step S1408, using the setting processing unit 809, the cyclic processing unit 801 imports the initial settings, and changes the settings of the multi-function peripheral 100. Thereafter, the present processing flow ends.

As described above, if the multi-function peripheral 100 is out of communication with the management server 200 for a certain period, control is performed to inactivate applications that have been installed in accordance with instructions (jobs) from the management server 200.

(Update Processing)

Figure 15:
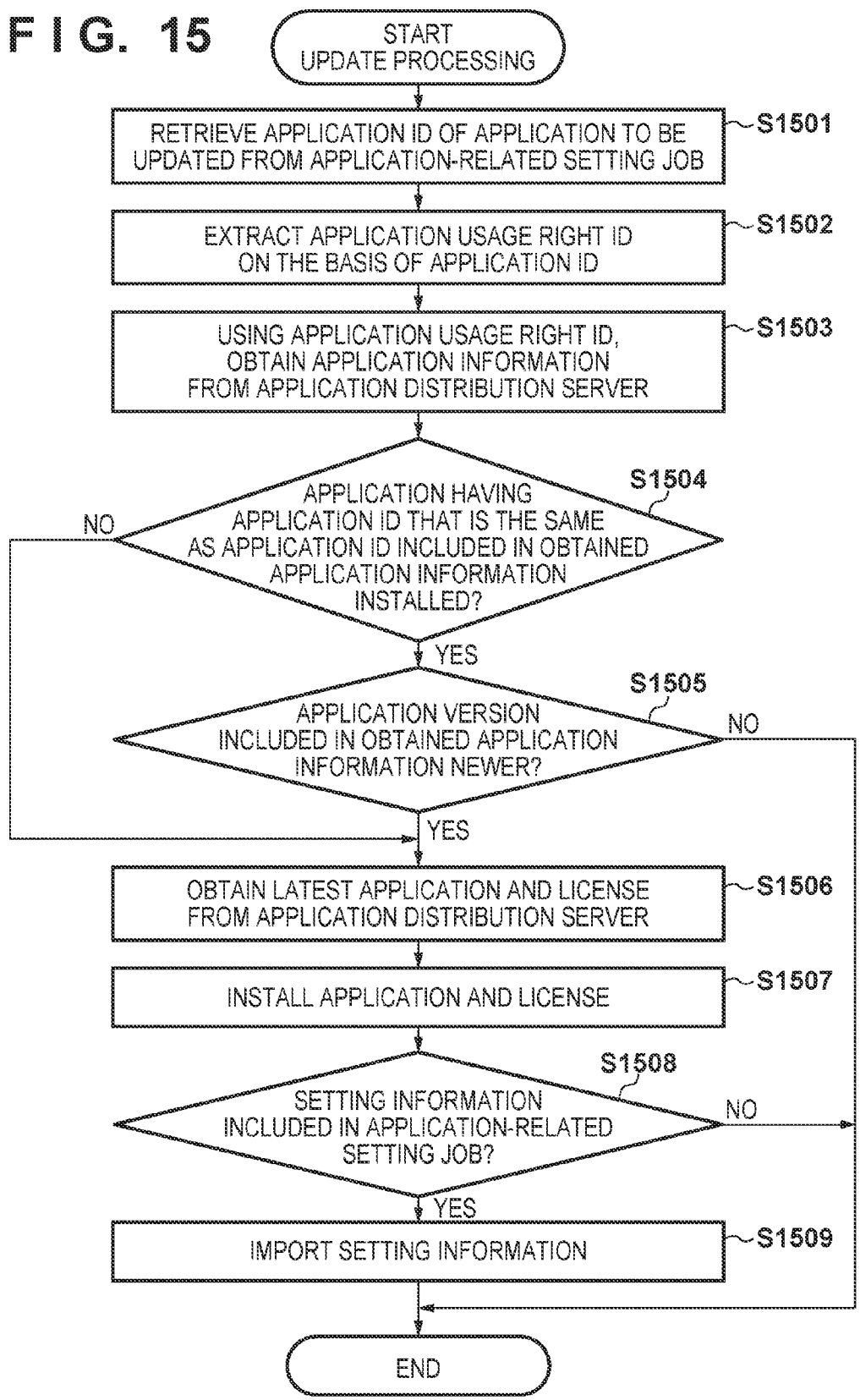
FIG. 15 is a flowchart showing a flow of update processing.

FIG. 15 is a flowchart showing the flow of the update processing. This processing corresponds to the processing of step S1009 in FIG. 10.

In step S1501, the cyclic processing unit 801 retrieves, from the application-related setting job information, identification information (application ID) of the application to be updated.

In step S1502, based on the retrieved identification information of the application, the cyclic processing unit 801 extracts a corresponding application usage right ID from among stored application usage right IDs. Then, the cyclic processing unit 801 passes the extracted application usage right ID to the application obtainment processing unit 804.

In step S1503, using the application usage right ID received from the cyclic processing unit 801, the application obtainment processing unit 804 obtains application information from the application distribution server 300. At this time, the application distribution server 300 distributes the application information corresponding to the application usage right ID to the multi-function peripheral 100 in reply to a request transmitted from the multi-function peripheral 100 including the application usage right ID. The application information indicates, for example, the identification information of the application and information of the latest version of the application. When the application usage right ID is unauthorized, the application distribution server 300 may give notice of its unauthorized state.

In step S1504, the application obtainment processing unit 804 retrieves the application ID from the application information that was received from the application distribution server 300 in step S1503, and determines whether the application having the same application ID is installed. If the application having the same application ID is installed (YES of step S1504), the present processing flow proceeds to step S1505; if not (NO of step S1504), the present processing proceeds to step S1506.

In step S1505, using the installation control application 307, the application obtainment processing unit 804 obtains version information of the application having the same application ID as the application ID retrieved in step S1504. Then, the application obtainment processing unit 804 compares the obtained version information with the version information included in the application information that was received from the application distribution server 300 in step S1503. If the version information included in the application information that was received from the application distribution server 300 in step S1503 is newer (YES of step S1505), the present processing flow proceeds to step S1506; if not (NO of step S1505), the present processing flow ends.

In step S1506, using the application usage right ID received from the cyclic processing unit 801, the application obtainment processing unit 804 obtains an update-specific application file and an update-specific license file from the application distribution server 300, and passes the update-specific application file and the update-specific license file to the installation processing unit 805. The obtained update-specific application file and license file are of the version designated by the application information obtained in step S1503. This version of the application may be the latest version, or may be a version corresponding to the application usage right ID.

In step S1507, using the installation control application 307, the installation processing unit 805 installs the application file and the license file received from the application obtainment processing unit 804.

In step S1508, the cyclic processing unit 801 determines whether the application-related setting job information includes setting information. If the setting information is included (YES of step S1508), the present processing flow proceeds to step S1509; if not (NO of step S1508), the present processing flow ends.

In step S1509, using the setting processing unit 809, the cyclic processing unit 801 imports the setting information included in the application-related setting job information, and changes the settings of the multi-function peripheral 100.

Through the foregoing processing, an application installed in the multi-function peripheral 100 can be updated by remotely registering an application-related setting job for an update purpose.

(Uninstallation Processing)

Figure 16:
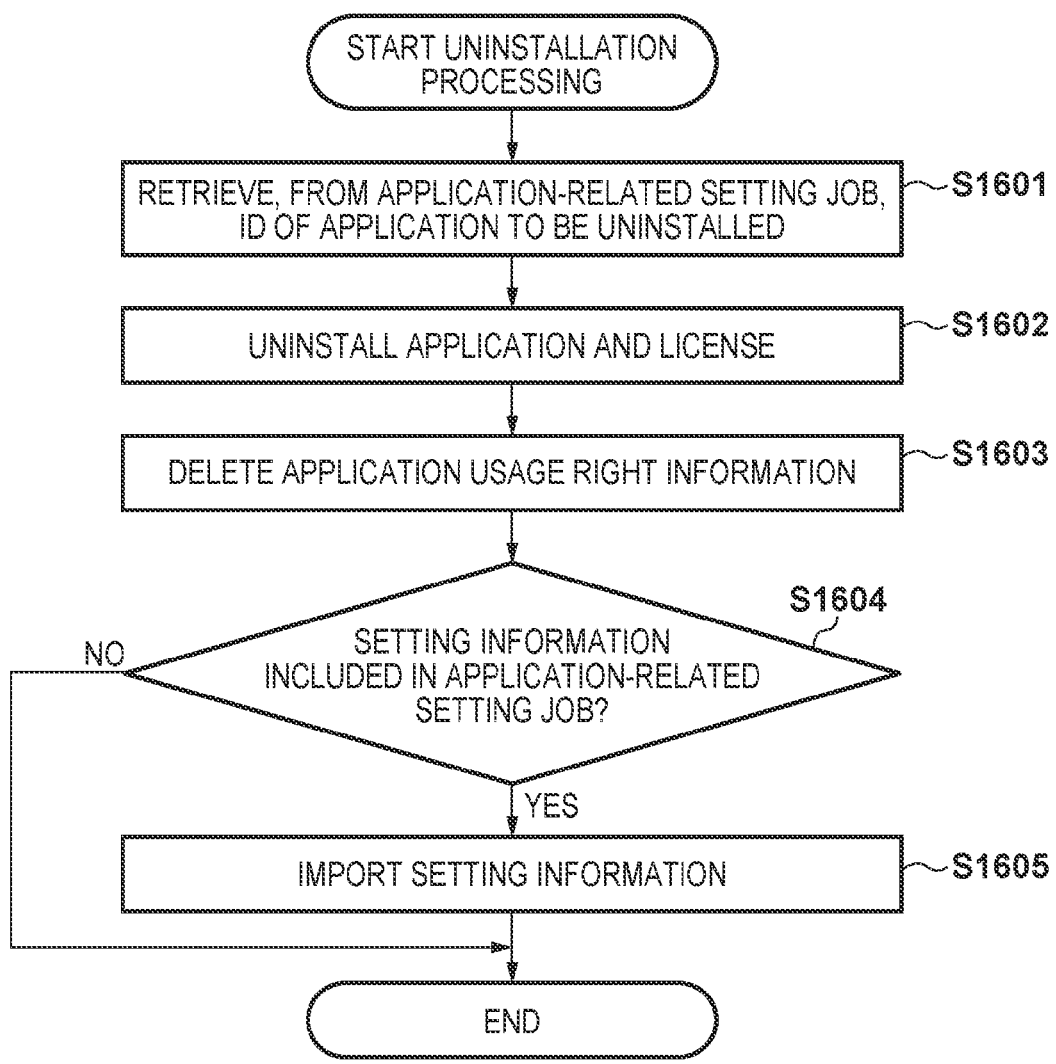
FIG. 16 is a flowchart showing a flow of uninstallation processing.

FIG. 16 is a flowchart showing the flow of the uninstallation processing. This processing corresponds to the processing of step S1008 in FIG. 10.

In step S1601, the cyclic processing unit 801 retrieves, from the application-related setting job information, an application ID of the application to be uninstalled, and passes the application ID to the uninstallation processing unit 806.

In step S1602, using the installation control application 307, the uninstallation processing unit 806 uninstalls the application and the license corresponding to the application ID received from the cyclic processing unit 801.

In step S1603, the cyclic processing unit 801 deletes an application usage right ID that is stored in correspondence with the application ID retrieved in step S1601.

In step S1604, the cyclic processing unit 801 determines whether the application-related setting job information includes setting information. If the setting information is included (YES of step S1604), the present processing flow proceeds to step S1605; if not (NO of step S1604), the present processing flow ends.

In step S1605, using the setting processing unit 809, the cyclic processing unit 801 imports the setting information included in the application-related setting job information, and changes the settings of the multi-function peripheral 100. Thereafter, the present processing flow ends.

Through the foregoing processing, an application installed in the multi-function peripheral 100 can be uninstalled by remotely registering an application-related setting job for uninstallation.

In the present invention, the above-described units enable application life-cycle management and changing of application-related settings remotely and simultaneously, thereby improving the efficiency of work related to application management.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-116028, filed Jun. 8, 2015, which is hereby incorporated by reference herein in its entirety.

What is claimed is:

1. A management system, comprising:
an information processing apparatus;
a management apparatus that manages an application for the information processing apparatus; and
a distribution apparatus that distributes data related to the application,
wherein the information processing apparatus includes:
an obtainment unit configured to obtain a job related to the application, from the management apparatus;
a control unit configured to control the application for the information processing apparatus in accordance with the job obtained by the obtainment unit;
a setting unit configured to change, along with the control by the control unit, at least one of settings of the information processing apparatus and settings of the application in accordance with setting information included in the job obtained by the obtainment unit,
wherein, in a case in which the job obtained by the obtainment unit represents an instruction to install the application, the control unit obtains, from the distribution apparatus, an application file and a license file that correspond to the application designated by the job, and installs the application using the application file and the license file; and
a determination unit configured to determine whether communication with the management apparatus has failed for a certain period, and
wherein, in a case in which the determination unit has determined that the communication with the management apparatus has failed for the certain period, the control unit stops an application installed in accordance with the job obtained from the management apparatus, and
along with the stopping of the application by the control unit, the setting unit changes the settings of the information processing apparatus and the settings of the application to those of settings prior to installation of the stopped application.

2. The management system according to claim 1, wherein, in a case in which the job obtained by the obtainment unit represents an instruction to update the application, the control unit obtains, from the distribution apparatus, an update-specific application file and an update-specific license file that correspond to the application designated by the job, and updates the application using the update-specific application file and the update-specific license file.

3. The management system according to claim 1, wherein, in a case in which the job obtained by the obtainment unit represents an instruction to uninstall the application, the control unit uninstalls the application designated by the job and a license corresponding to the application.

4. The management system according to claim 1, wherein, in a case in which the job obtained by the obtainment unit represents an instruction to start the application, the control unit starts the application after installing the license file corresponding to the application designated by the job.

5. The management system according to claim 1, wherein, in a case in which the job obtained by the obtainment unit represents an instruction to stop the application, the control unit stops the application designated by the job.

6. The management system according to claim 5, wherein when the application has been stopped, the control unit inactivates and stores the license file corresponding to the application.

7. The management system according to claim 6, wherein the license file that has been inactivated and stored along with the stopping of the application becomes usable again in a case where the job obtained from the management apparatus represents an instruction to start the application.

8. The management system according to claim 1, wherein the information processing apparatus further includes a storage unit configured to store a pre-change setting value, when the setting unit changes the settings.

9. The management system according to claim 1, wherein the obtainment unit periodically queries the management apparatus about the job.

10. The management system according to claim 1, wherein the information processing apparatus further includes a notification unit configured to notify the management apparatus of the at least one of the settings changed by the setting unit and a state of the application.

11. The management system according to claim 1, wherein the management apparatus includes a display unit configured to display a registration screen for job registration.

12. The management system according to claim 11, wherein in registering a job representing an installation instruction, the registration screen does not display information of an application that is already installed in the information processing apparatus, and displays a newly installable application in a selectable manner.

13. An information processing apparatus connected to a management apparatus that performs application management and to a distribution apparatus that distributes application-related data, the information processing apparatus comprising:
an obtainment unit configured to obtain an application-related job from the management apparatus;
a control unit configured to control an application for the information processing apparatus in accordance with the job obtained by the obtainment unit;
a setting unit configured to change, along with the control by the control unit, at least one of settings of the information processing apparatus and settings of the application in accordance with setting information included in the job obtained by the obtainment unit,
wherein, in a case in which the job obtained by the obtainment unit represents an instruction to install the application, the control unit obtains, from the distribution apparatus, an application file and a license file that correspond to the application designated by the job, and installs the application using the application file and the license file; and
a determination unit configured to determine whether communication with the management apparatus has failed for a certain period,
wherein, in a case in which the determination unit has determined that the communication with the management apparatus has failed for the certain period, and the control unit stops an application installed in accordance with the job obtained from the management apparatus, and along with the stopping of the application by the control unit, the setting unit changes the settings of the information processing apparatus and the settings of the application to those of settings prior to installation of the stopped application.

14. A non-transitory computer-readable medium storing a program that causes a computer to function as:

an obtainment unit configured to obtain an application-related job;

a control unit configured to control an application for the computer in accordance with the job obtained by the obtainment unit;

a setting unit configured to change, along with the control by the control unit, at least one of settings of the computer and settings of the application in accordance with setting information included in the job obtained by the obtainment unit, wherein, in a case in which the job obtained by the obtainment unit represents an instruction to install the application, the control unit obtains, from a distribution apparatus, an application file and a license file that correspond to the application designated by the job, and installs the application using the application file and the license file; and a determination unit configured to determine whether communication with the management apparatus has failed for a certain period, wherein, in a case in which the determination unit has determined that the communication with the management apparatus has failed for the certain period, and the control unit stops an application installed in accordance with the job obtained from the management apparatus, and along with the stopping of the application by the control unit, the setting unit changes the settings of the information processing apparatus and the settings of the application to those of settings prior to installation of the stopped application.

\* \* \* \* \*